US012250719B2

(12) United States Patent
Jang et al.

(10) Patent No.: US 12,250,719 B2
(45) Date of Patent: Mar. 11, 2025

(54) METHOD AND APPARATUS FOR PERFORMING SENSING IN WIRELESS LAN SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 18/025,825

(22) PCT Filed: Sep. 3, 2021

(86) PCT No.: PCT/KR2021/011926
§ 371 (c)(1),
(2) Date: Mar. 10, 2023

(87) PCT Pub. No.: WO2022/055182
PCT Pub. Date: Mar. 17, 2022

(65) Prior Publication Data

US 2023/0362990 A1 Nov. 9, 2023

Related U.S. Application Data

(60) Provisional application No. 63/232,640, filed on Aug. 13, 2021, provisional application No. 63/218,499,
(Continued)

(51) Int. Cl.
*H04W 74/0808* (2024.01)
*H04W 74/08* (2024.01)
*H04W 84/12* (2009.01)

(52) U.S. Cl.
CPC .................. *H04W 74/0808* (2013.01); *H04W 74/0866* (2013.01); *H04W 84/12* (2013.01)

(58) Field of Classification Search
CPC ......... H04W 74/0808; H04W 74/0866; H04W 84/12
See application file for complete search history.

(56) References Cited

U.S. PATENT DOCUMENTS 10,536,932 B2 1/2020 Chun et al.
2007/0002890 A1 1/2007 Mangold et al.
(Continued)

FOREIGN PATENT DOCUMENTS

EP 1845749 10/2007
EP 2675219 2/2012
(Continued)

OTHER PUBLICATIONS

Chen, Cheng et al., "Overview of WLAN sensing protocol", doc.: IEEE 802.11-20/1232r0, Aug. 2020, 13 pages.
(Continued)

*Primary Examiner* — Mohammad S Anwar
(74) *Attorney, Agent, or Firm* — LEE, HONG, DEGERMAN, KANG & WAIMEY

(57) ABSTRACT

Proposed are a method and apparatus for performing sensing in a wireless LAN system. In detail, a first STA broadcasts a sensing request frame. The first STA receives a first sensing response frame form a second STA and receives a second sensing response frame from a third STA. The sensing request frame includes STA identifier information and RU allocation information. The STA identifier information includes identifiers of the second and third STAs. The RU allocation information includes information about a first RU allocated to the second STA and information about a second RU allocated to the third STA. The first sensing
(Continued)

response frame is received through the first RU. The second sensing response frame is received through the second RU.

14 Claims, 49 Drawing Sheets

Related U.S. Application Data filed on Jul. 6, 2021, provisional application No. 63/111,087, filed on Nov. 9, 2020, provisional application No. 63/087,315, filed on Oct. 5, 2020, provisional application No. 63/082,421, filed on Sep. 23, 2020, provisional application No. 63/080,803, filed on Sep. 21, 2020, provisional application No. 63/077,719, filed on Sep. 14, 2020, provisional application No. 63/076,394, filed on Sep. 10, 2020.

(56) References Cited

U.S. PATENT DOCUMENTS

| | | | | |
|---|---|---|---|---|
| 2016/0345277 | A1* | 11/2016 | Segev | H04W 56/001 |
| 2019/0007977 | A1* | 1/2019 | Asterjadhi | H04W 74/0833 |
| 2019/0191451 | A1* | 6/2019 | Patil | H04W 74/0833 |

FOREIGN PATENT DOCUMENTS

| | | |
|---|---|---|
| JP | 2017055398 | 3/2017 |
| JP | 2020043511 | 3/2020 |
| JP | 2023538286 | 9/2023 |
| KR | 20150138159 | 12/2015 |
| KR | 20160008537 | 1/2016 |
| WO | 2020011684 | 1/2020 |
| WO | 2020152031 | 7/2020 |
| WO | 2021256838 | 12/2021 |
| WO | 2022039669 | 2/2022 |

OTHER PUBLICATIONS

Liu, ChenChen, et al., "Follow-ups on Channel Measurement Procedure for WLAN Sensing", doc.: IEEE 802.1120r1, Aug. 2020, 17 pages.

PCT International Application No. PCT/KR2021/011926, International Search Report dated Dec. 3, 2021, 4 pages.

U.S. Appl. No. 18/373,086, Office Action dated Nov. 21, 2023, 12 pages.

Chen, et al., "Overview of WLAN sensing protocol," IEEE 802.11-20/1232r0, Aug. 2020, 11 pages.

U.S. Appl. No. 18/373,086, Final Office Action dated Mar. 6, 2024, 16 pages.

Japan Patent Office Application No. 2023-515810, Office Action dated Mar. 12, 2024, 3 pages.

Chen, et al., "WLAN Sensing Definitions," IEEE 802.11-20/0807r0, May 2020, 12 pages.

Cariou, et al., "Polling for MU Measurements," IEEE 802.11-17/0598r0, Apr. 2017, 12 pages.

European Patent Office Application Serial No. 21867048.7, Search Report dated Sep. 18, 2024, 10 pages.

* cited by examiner (a)

| Order | Information |
|---|---|
| 1 | Category |
| 2 | Sensing Action |
| 3 | Dialog Token |
| 4 | Control of Roles |
| 5 | Control of Sensing Parameters |
| 6 | Timeout |
| ••• | ••• |

| Code | Meaning |
|---|---|
| 32 | WLAN Sensing |

| Sensing Action values | Meaning |
|---|---|
| 0 | Sensing Request |
| 1 | Sensing Response |
| ••• | ••• |

METHOD AND APPARATUS FOR PERFORMING SENSING IN WIRELESS LAN SYSTEM

CROSS-REFERENCE TO RELATED APPLICATIONS

This application is the National Stage filing under 35 U.S.C. 371 of International Application No. PCT/KR2021/011926, filed on Sep. 3, 2021, and also claims the benefit of U.S. Provisional Application No. 63/076,394, filed on Sep. 10, 2020, 63/077,719, filed on Sep. 14, 2020, 63/080,803, filed on Sep. 21, 2020, 63/082,421, filed on Sep. 23, 2020, 63/087,315, filed on Oct. 5, 2020, 63/111,087, filed on Nov. 9, 2020, 63/218,499, filed on Jul. 6, 2021, and 63/232,640, filed on Aug. 13, 2021, the contents of which are all incorporated by reference herein in their entirety.

TECHNICAL FIELD

The present specification relates to a technique for performing sensing in a wireless LAN system, and more particularly, to a method and an apparatus for performing a sensing procedure by negotiating parameters to be used for sensing and an STA to participate in sensing.

BACKGROUND

A wireless local area network (WLAN) has been improved in various ways. For example, IEEE 802.11bf wireless LAN sensing is the first standard that converges communications and radar technologies. Although the demand for unlicensed spectrum is rapidly increasing in everyday life and industry, there is a limit to the new spectrum supply. Therefore, the development of convergence technology between communication and radar is a very desirable direction in terms of increasing frequency utilization efficiency. Sensing technology that detects movement behind a wall using a wireless LAN signal or a radar technology that detects movement in a vehicle using a Frequency Modulated Continuous Wave (FMCW) signal in the 70 GHz band is being developed. It can be of great significance in that it can raise the sensing performance to one level by linking it. In particular, as the importance of privacy protection is increasingly emphasized in modern society, the development of wireless LAN sensing technology that is legally free from the issue of privacy infringement is more expected than CCTV.

Meanwhile, the overall radar market across automobiles, defense, industry, and life is expected to grow at a compound annual growth rate (CAGR) of about 5% by 2025, and in particular, in the case of living sensors, the CAGR is expected to grow rapidly to 70%. Wireless LAN sensing technology can be applied to a wide range of real-life applications such as motion detection, breathing monitoring, positioning/tracking, fall detection, in-vehicle infant detection, appearance/proximity recognition, personal identification, body motion recognition, and behavior recognition, thereby promoting the growth of related new businesses and It is expected to contribute to enhancing the competitiveness of the company.

SUMMARY

The present specification proposes a method and an apparatus for performing sensing in a wireless LAN system.

An example of the present specification proposes a method for performing sensing.

This embodiment may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11 ay systems.

This embodiment is performed in a first STA, and the first STA may correspond to a sensing initiator. The second and third STAs of this embodiment may correspond to sensing responders.

This embodiment proposes a method for determining STAs to participate in sensing in a WLAN system, negotiating parameters to be used for sensing, and performing a sensing procedure based on the negotiated parameters. In particular, this embodiment proposes a method for role negotiation in the negotiation step, parameter negotiation, and parameter change in the sensing step.

A first station (STA) broadcasts a sensing request frame. The first STA receives a first sensing response frame from a second STA and receives a second sensing response frame from a third STA.

The sensing request frame includes STA identifier information and resource unit (RU) allocation information. The STA identifier information includes identifiers of the second and third STAs. The RU allocation information includes information on a first RU allocated to the second STA and information on a second RU allocated to the third STA.

The first sensing response frame is received through the first RU, and the second sensing response frame is received through the second RU. That is, the response to the sensing request frame may be (simultaneously) received by the second and third STAs based on orthogonal frequency division multiple access (OFDMA). The sensing request frame may be a (newly defined) trigger frame. When the STA identifier information does not include an identifier of a fourth STA, the first STA does not receive a third sensing response frame from the fourth STA.

That is, in this embodiment, the sensing request frame indicates an identifier (ID) of an STA to receive a sensing response frame and RU allocation information, the STA corresponding to the identifier of the STA receives the sensing request frame, and transmits the sensing response frame after SIFS through the allocated RU.

According to the embodiment proposed in this specification, various sensing measurement and sensing reporting scenarios can be defined through setup and negotiation procedures of STAs for WLAN sensing support, accordingly, there is an effect that the motion and change of a user or an object can be detected by efficiently and flexibly performing a sensing operation.

BRIEF DESCRIPTION OF THE DRAWINGS

FIG. 11 shows an example of a sensing action frame.

DETAILED DESCRIPTION

In the present specification, “A or B” may mean “only A”, “only B” or “both A and B”. In other words, in the present specification, “A or B” may be interpreted as “A and/or B”. For example, in the present specification, “A, B, or C” may mean “only A”, “only B”, “only C”, or “any combination of A, B, C”.

A slash (/) or comma used in the present specification may mean “and/or”. For example, “A/B” may mean “A and/or B”. Accordingly, “A/B” may mean “only A”, “only B”, or “both A and B”. For example, “A, B, C” may mean “A, B, or C”.

In the present specification, “at least one of A and B” may mean “only A”, “only B”, or “both A and B”. In addition, in the present specification, the expression “at least one of A or B” or “at least one of A and/or B” may be interpreted as “at least one of A and B”.

In addition, in the present specification, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

Technical features that are individually described in one drawing in this specification may be implemented individually or simultaneously.

The following examples of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may be applied to a newly proposed wireless LAN sensing standard or IEEE 802.11bf standard.

Hereinafter, technical features to which the present specification can be applied in order to describe the technical features of the present specification will be described.

Figure 1:
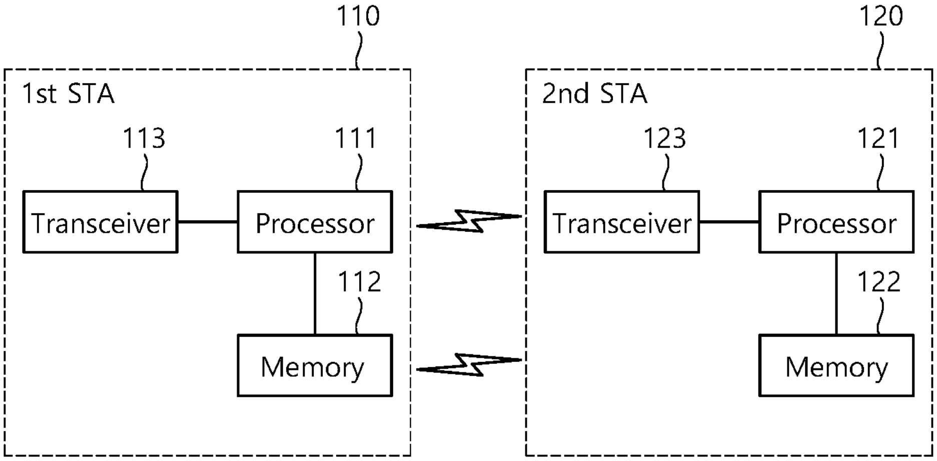
FIG. 1 shows an example of a transmitting apparatus and/or receiving apparatus of the present specification.
Figure 1:
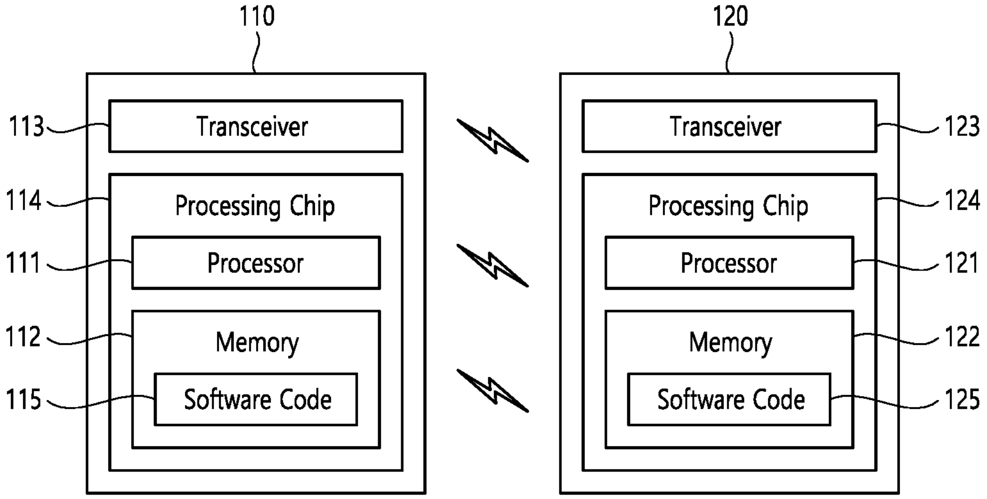

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Wireless LAN sensing technology is a kind of radar technology that can be implemented without standards, but it is judged that stronger performance can be obtained through standardization. The IEEE 802.11bf standard defines devices participating in WLAN sensing by function as shown in the table below. According to its function, it can be divided into a device that initiates wireless LAN sensing and a device that participates, and a device that transmits and receives a sensing PPDU (Physical Layer Protocol Data Unit).

TABLE 1

| Term | Function |
|---|---|
| Sensing Initiator | A device that initiates sensing |
| Sensing Responder | A device that participates in sensing |
| Sensing Transmitter | A device that transmits a sensing PPDU |
| Sensing Receiver | A device that receives a sensing PPDU |

Figure 2:
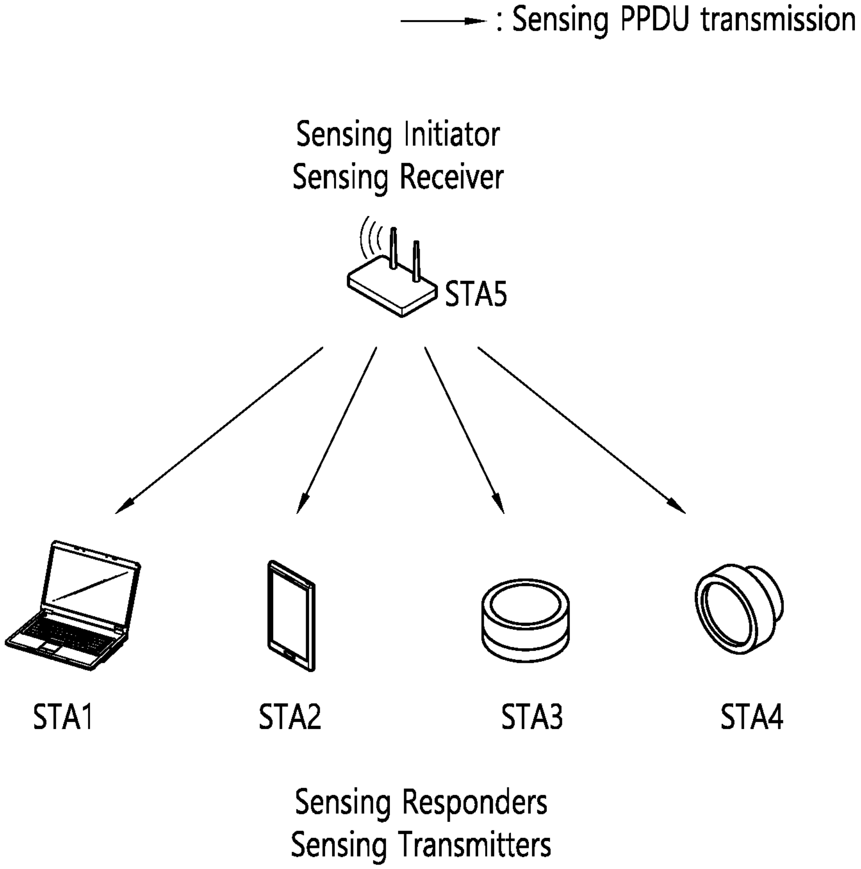
FIG. 2 shows an example of a wireless LAN sensing scenario using a multi-sensing transmitting device.

FIG. 2 shows an example of a wireless LAN sensing scenario using a multi-sensing transmitting device.

Figure 3:
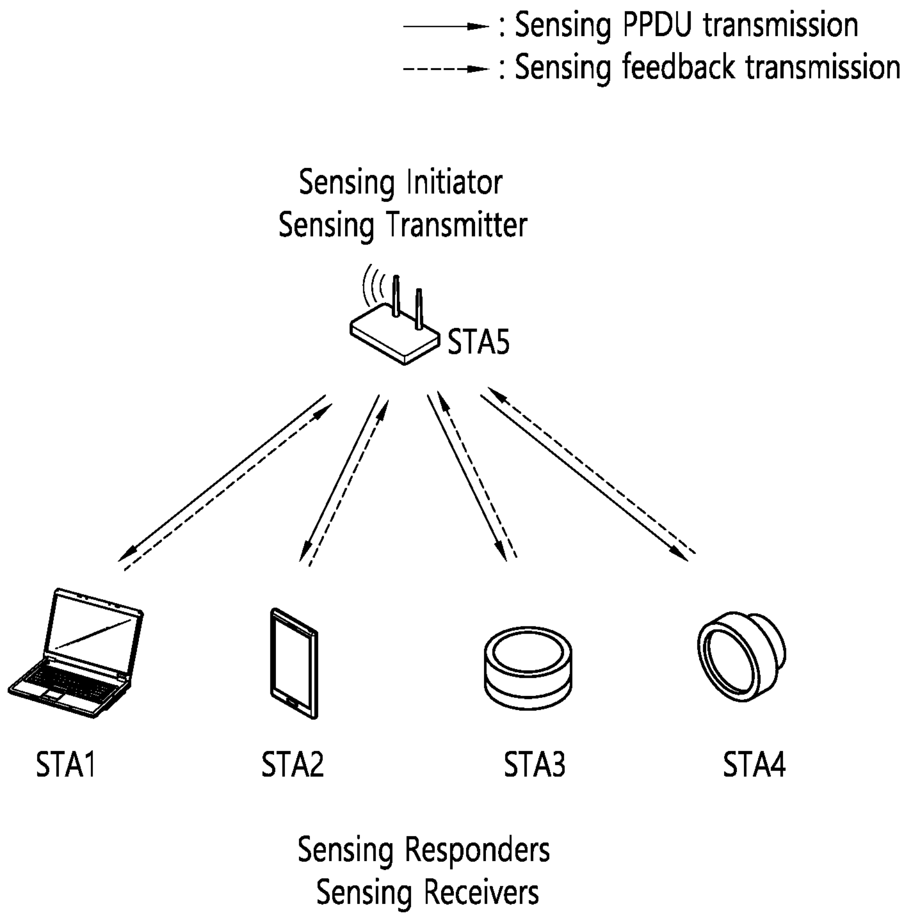
FIG. 3 shows an example of a wireless LAN sensing scenario using a multi-sensing receiving device.

FIG. 3 shows an example of a wireless LAN sensing scenario using a multi-sensing receiving device.

FIGS. 2 and 3 show sensing scenarios according to the function and arrangement of a wireless LAN sensing device. In an environment assuming one sensing start device and multiple sensing participating devices, FIG. 2 is a scenario using multiple sensing PPDU transmitting devices, and FIG. 3 is a scenario using multiple sensing PPDU receiving devices. Assuming that the sensing PPDU receiving device includes the sensing measurement signal processing device, in the case of FIG. 3, a procedure for transmitting (feedback) the sensing measurement result to the sensing initiate device (STA 5) is additionally required.

Figure 4:
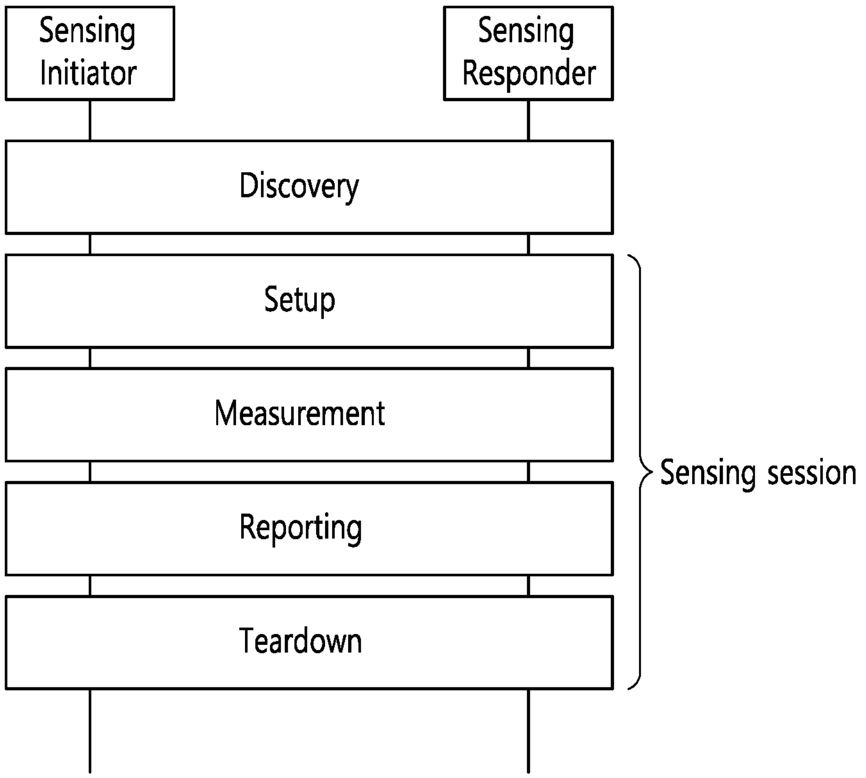
FIG. 4 shows an example of a wireless LAN sensing procedure.

FIG. 4 shows an example of a wireless LAN sensing procedure.

Looking at the procedure of wireless LAN sensing, discovery, negotiation, measurement exchange, and tear down are performed between the wireless LAN sensing initiate device and the participating device. Discovery is a process of identifying the sensing capabilities of WLAN devices, negotiation is a process of determining a sensing parameter between a sensing initiate device and a participating device, and measurement value exchange is a process of transmitting a sensing PPDU and transmitting a sensing measurement result, and connecting release is the process of terminating the sensing procedure.

Figure 5:
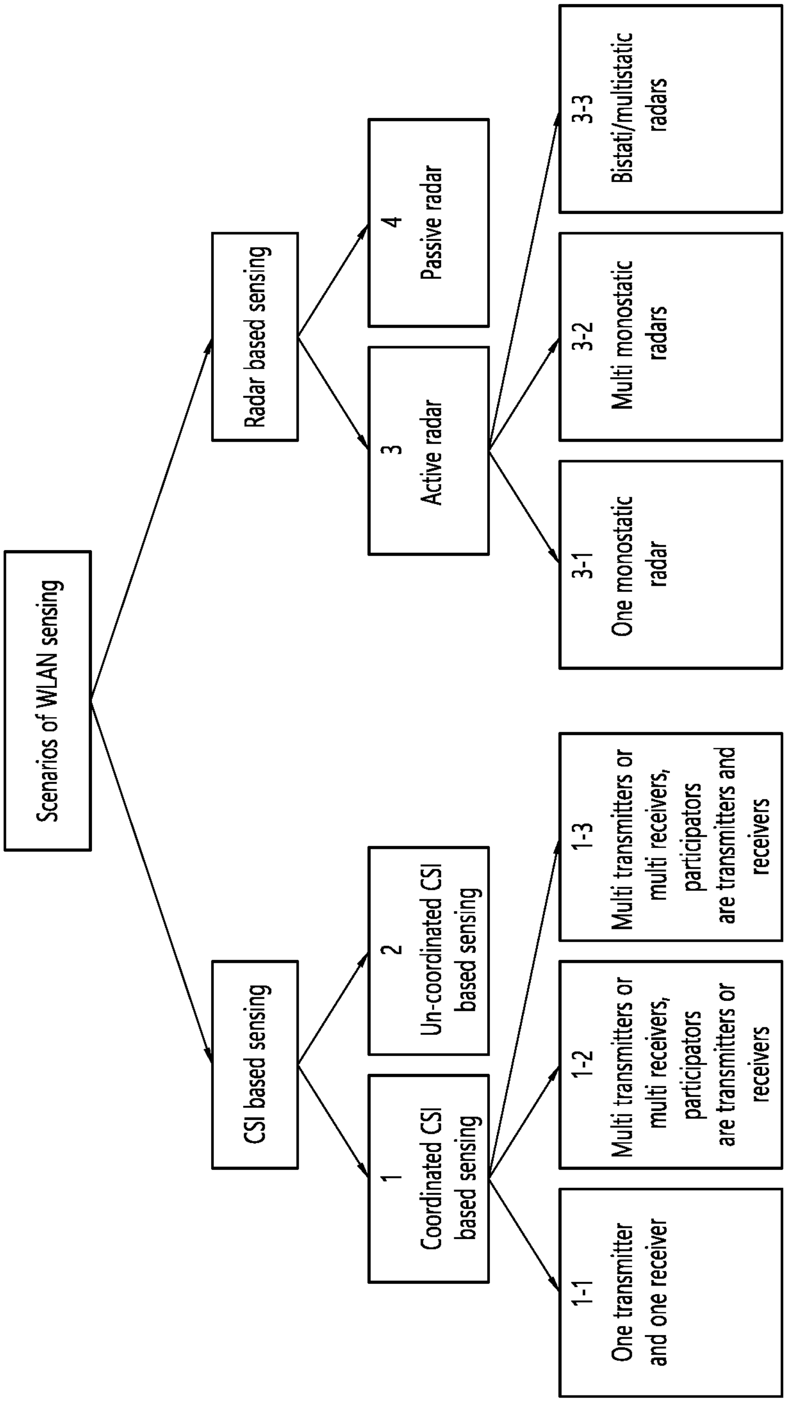
FIG. 5 is an example of classification of wireless LAN sensing.

FIG. 5 is an example of classification of wireless LAN sensing.

Wireless LAN sensing can be classified as "CSI-based sensing that uses channel state information of a signal that arrives at a receiver through a channel from a transmitter" and "Radar-based sensing that uses a signal received after a transmitted signal is reflected by an object". In addition, each sensing technology includes a method in which a sensing transmitter directly participates in the sensing process (coordinated CSI, active radar) and a method in which the sensing transmitter does not participate in the sensing process, that is, there is no dedicated transmitter participating in the sensing process (un-coordinated CSI, passive radar).

Figure 6:
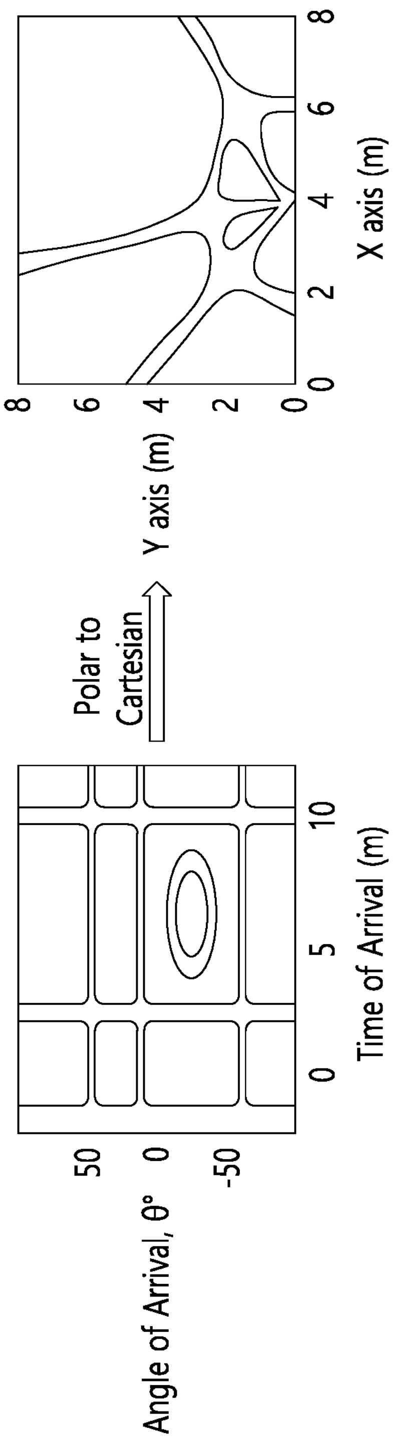
FIG. 6 shows indoor positioning using CSI-based WLAN sensing.

FIG. 6 shows indoor positioning using CSI-based WLAN sensing.

FIG. 6 shows that CSI-based wireless LAN sensing is used for indoor positioning. The sensing device may obtain indoor positioning information by obtaining an angle of arrival and a time of arrival by using the CSI and converting these into orthogonal coordinates.

Figure 7:
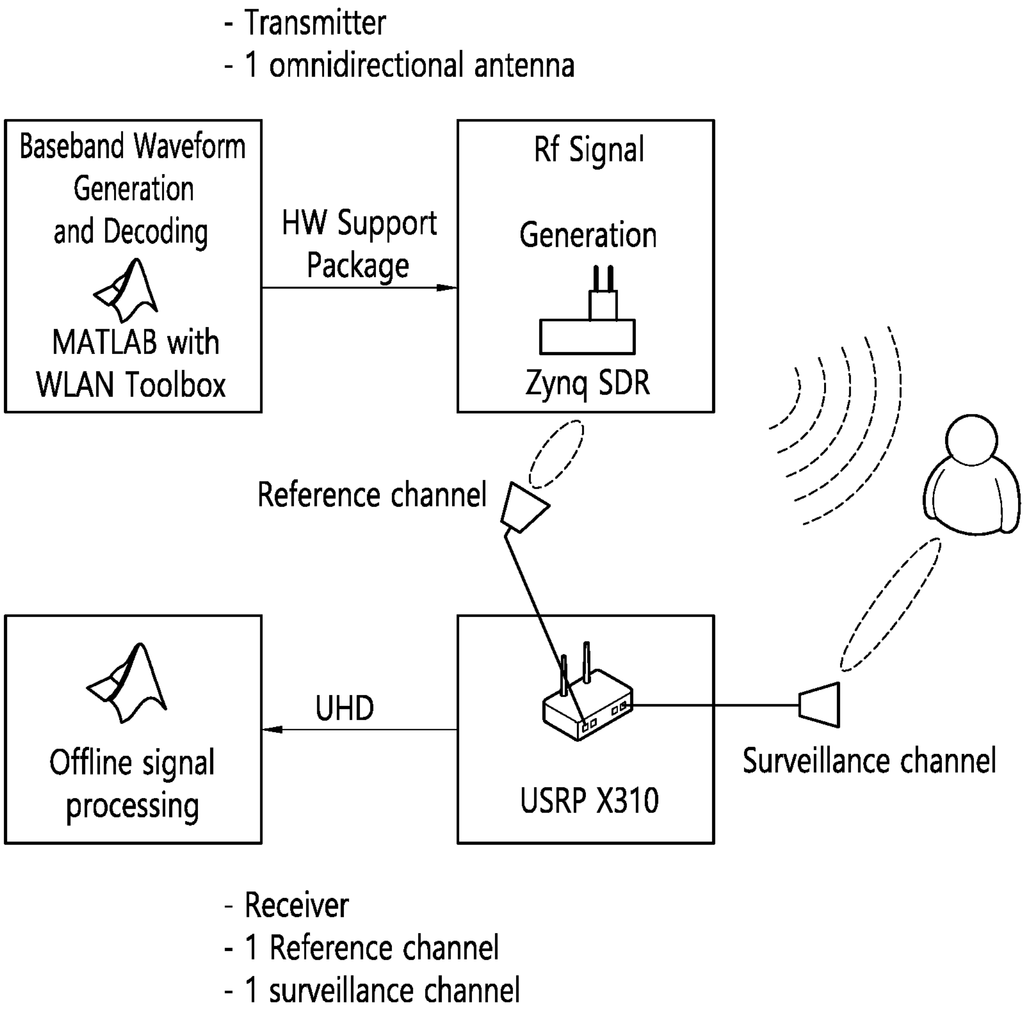
FIG. 7 is an example of an implementation of a wireless LAN sensing device.

FIG. 7 is an example of an implementation of a wireless LAN sensing device.

FIG. 7 is an implementation of a wireless LAN sensing device using MATLAB Toolbox, Zynq, and USRP. An IEEE 802.11ax wireless LAN signal is generated in the MATLAB toolbox, and an RF signal is generated using Zynq Software Defined Radio (SDR). The signal passing through the channel is received by USRP SDR and the sensing signal processing is performed in the MATLAB toolbox. Here, one reference channel (a channel that can be directly received from a sensing transmitter) and one surveillance channel (a channel that can be received by being reflected by an object) are assumed. As a result of analysis using a wireless LAN sensing device, a unique characteristic that can distinguish movement or body movement was obtained.

Currently, IEEE 802.11bf wireless LAN sensing standardization is in the initial development stage, and cooperative sensing technology to improve sensing accuracy will be treated as important in the future. It is expected that the synchronization technology of sensing signals for cooperative sensing, CSI management and use technology, sensing parameter negotiation and sharing technology, and scheduling technology for CSI generation will be the key topics for standardization. In addition, long-distance sensing technology, low-power sensing technology, sensing security and privacy protection technology will also be considered as major agenda items.

IEEE 802.11bf wireless LAN sensing is a kind of radar technology that uses a wireless LAN signal that is commonly present anytime, anywhere. The table below shows typical IEEE 802.11bf use cases, which can be used in a wide range of real-life situations, such as indoor sensing, motion recognition, health care, 3D vision, and in-vehicle sensing. Because it is mainly used indoors, the operating range is usually within 10 to 20 meters, and the distance accuracy does not exceed 2 meters at most.

TABLE 2

| Name | details | Max range (m) | Key Performance Indicator | Range Accuracy (m) | Max Velocity (m/s)/ Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the | 6 | Localization of persons to | 0.2 | 0.5/0.05 | 3 |

TABLE 2-continued

| Name | details | Max range (m) | Key Performance Indicator | Range Accuracy (m) | Max Velocity (m/s)/ Velocity Accuracy | angular Accuracy (deg) |
|---|---|---|---|---|---|---|
| | sound of an audio system at those people | | within 0.2 m | | | |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/ gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | 2 | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/ Pulse Accuracy | 0.5 | 2/0.1 | |
| Surveillance/ Monitoring of elder people and/ or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet | 0.2-0.5 | 20/0.1 | |

TABLE 2-continued

| Name | details | Max range (m) | Key Performance Indicator | Range Accuracy (m) | Max Velocity (m/s)/ Velocity Accuracy | angular Accuracy (deg) |
|---|---|---|---|---|---|---|
| 3d vision | building a 3d picture of an environment, using multiple STA | 10 | volume accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

Figure 8:
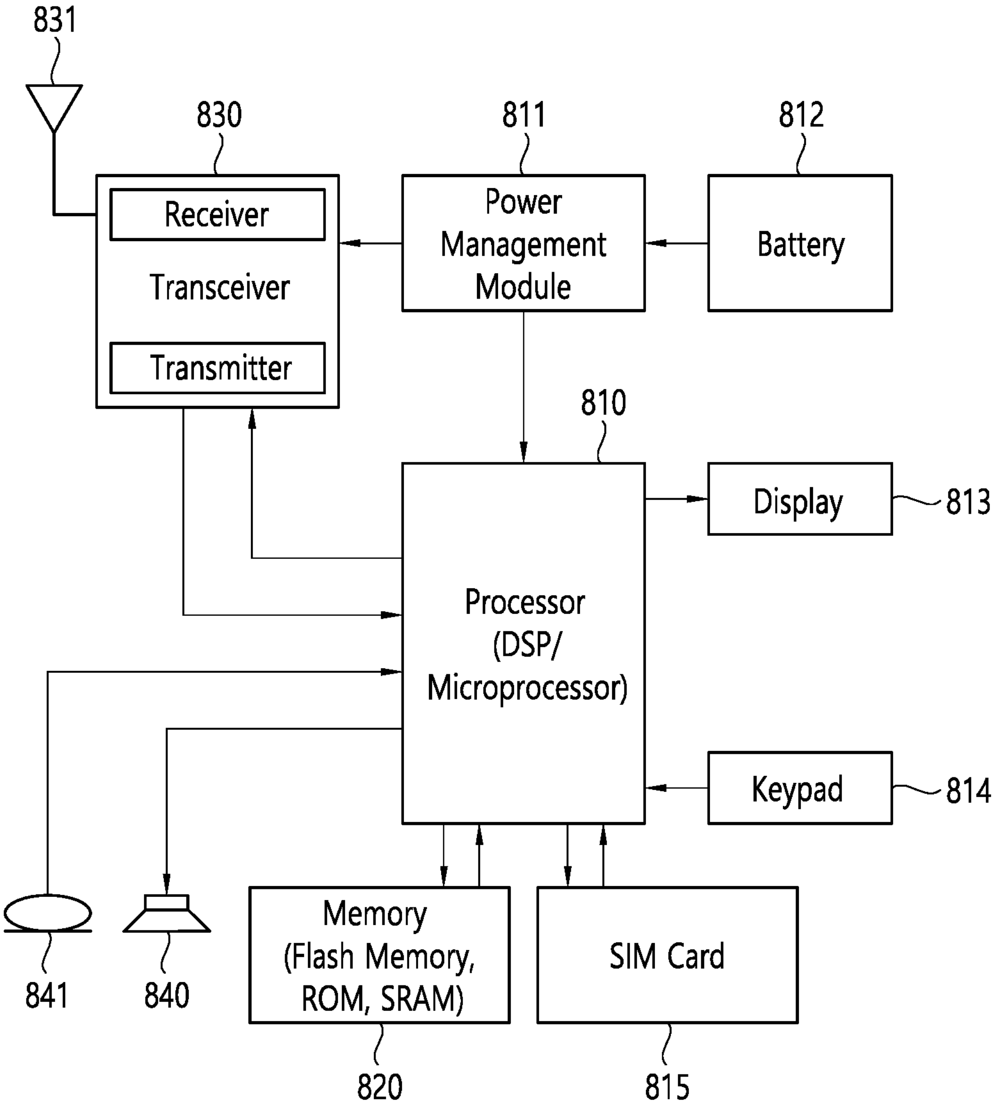
FIG. 8 illustrates an example of a modified transmission device and/or receiving device of the present specification.

FIG. 8 illustrates an example of a modified transmission device and/or receiving device of the present specification.

Each device/STA of the sub-figure (a)/(b) of FIG. 1 may be modified as shown in FIG. 8. A transceiver 630 of FIG. 8 may be identical to the transceivers 113 and 123 of FIG. 1. The transceiver 630 of FIG. 8 may include a receiver and a transmitter.

A processor 610 of FIG. 8 may be identical to the processors 111 and 121 of FIG. 1. Alternatively, the processor 610 of FIG. 8 may be identical to the processing chips 114 and 124 of FIG. 1.

A memory 620 of FIG. 8 may be identical to the memories 112 and 122 of FIG. 1. Alternatively, the memory 620 of FIG. 8 may be a separate external memory different from the memories 112 and 122 of FIG. 1.

Referring to FIG. 8, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 8, a speaker 640 may output a result related to a sound processed by the processor 610. A microphone 641 may receive an input related to a sound to be used by the processor 610.

11SENS uses 60 GHz Wi-Fi signal to sense the motion or gesture of an STA or a person, so 802.11ad and 802.11 ay, which are 60 GHz Wi-Fi technologies, are being considered. In this specification, for efficient Wi-Fi sensing, a method for configuring a sensing start frame, a transmission start frame, and a sensing signal for channel estimation between an AP and an STA or between STAs, and a sensing sequence for transmitting and receiving a sensing start frame, a transmission start frame, and a sensing signal are proposed.

The STA described below may be the device of FIGS. 1 and/or 8. A device may be an AP or a non-AP STA.

WLAN (Wireless Local Area Network) was introduced for the purpose of short-distance data transmission using an unlicensed band. IEEE 802.11 MAC/PHY-based WLAN (e.g., Wi-Fi) has become a representative technology to the extent that it is currently deployed almost everywhere.

WLAN (e.g., Wi-Fi) was designed for transmission of data signals, but its use has recently been expanded for purposes other than data transmission.

A WLAN (e.g., Wi-Fi) signal transmitted from a transmitting end to a receiving end may include information about a transmission channel environment between the two transmitting and receiving ends. WLAN sensing refers to a technology for obtaining cognitive information on various surrounding environments by processing information on a transmission channel environment obtained through a WLAN signal.

For example, cognitive information includes information obtained through technology such as gesture recognition, fall detection by elder people, intrusion detection, human motion detection, health monitoring, and pet movement detection.

Additional services can be provided through cognitive information, and WLAN sensing can be applied and used in various forms in real life. As a method for increasing the accuracy of WLAN sensing, devices having one or more WLAN sensing functions can be used for WLAN sensing. WLAN sensing using multiple devices can use multiple pieces of information about the channel environment compared to the method using one device (i.e., transmitting/receiving end), so more accurate sensing information can be obtained.

WLAN (e.g., Wi-Fi) transmission is performed in a broadband using channel aggregation, channel bonding, and the like. In addition, WLAN transmission in a more extended broadband is being discussed.

Recently, interest in WLAN devices that perform sensing using WLAN signals is increasing, and IEEE 802.11 is discussing by forming a Study Group. WLAN sensing can include various scenarios.

Figure 9:
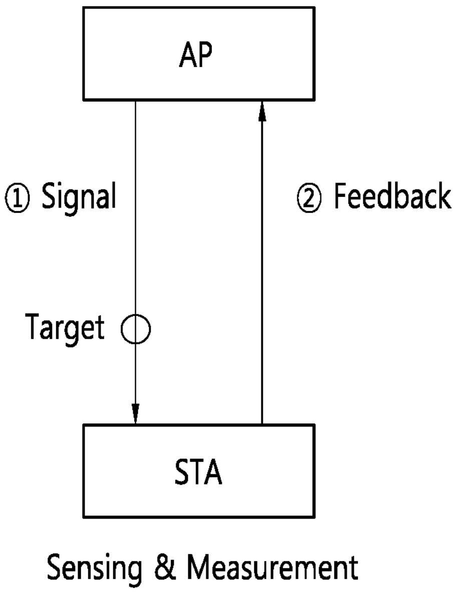
FIG. 9 shows an example of WLAN sensing.

FIG. 9 shows an example of WLAN sensing.

Referring to FIG. 9, a target to be sensed may exist and STAs sensing the target may exist. For example, an AP and an STA may perform sensing. A target may exist between the AP and the STA. For example, an AP may transmit a sensing signal to an STA, and the STA may transmit a feedback signal for the sensing signal to the AP. That is, the AP transmits a signal to identify the sensing target, and the STA can receive and measure a signal affected by the target. The STA transmits the measured result to the AP, and the AP can identify a target based on the measured result.

Figure 10:
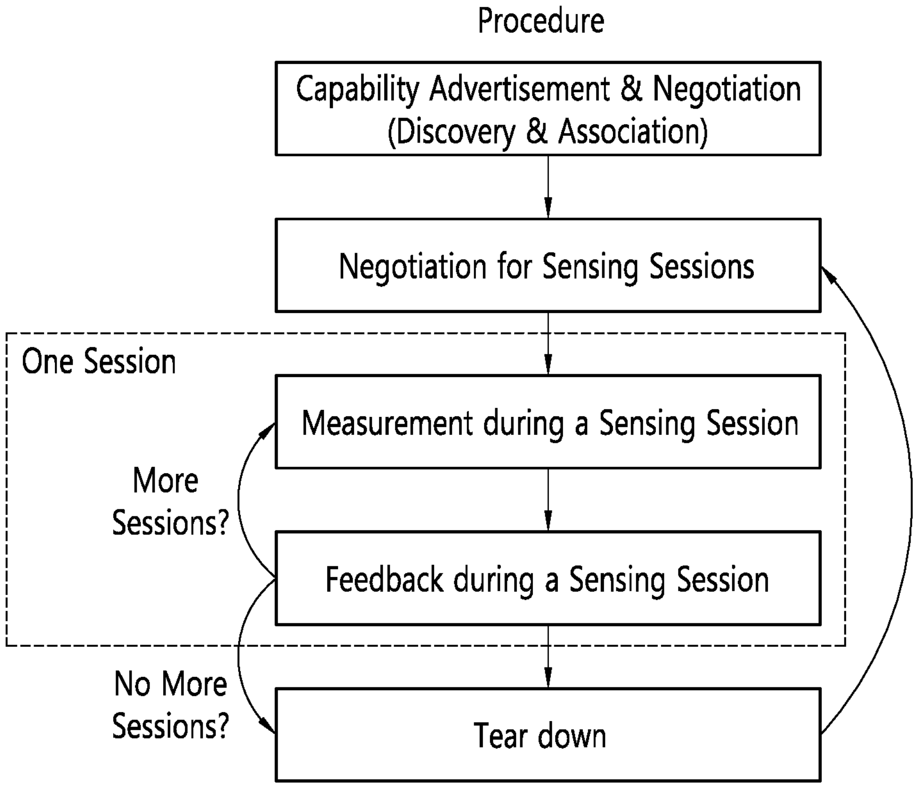
FIG. 10 is a flowchart illustrating a procedure of WLAN sensing.

Basically, steps as shown in FIG. 10 may be performed for WLAN sensing.

FIG. 10 is a flowchart illustrating a procedure of WLAN sensing.

1) Setup Phase (Capability Advertisement & Negotiation): A phase of exchanging sensing-related capabilities and forming an association. Through this process, STAs can perform association by determining whether sensing is possible and whether they have appropriate sensing capabilities. The Setup Phase may also be named Discovery & Association Phase.
2) Negotiation Phase (grouping may also be included if necessary): Negotiation is performed for each STA's role related to sensing and parameters to be used during sensing. Using these negotiated roles and parameters, these negotiated roles/parameters can be used in multiple sensing sessions before tear-down. The Negotiation Phase may also be named a Setup Phase.
3) Sensing Phase (Measurement and Feedback/Reporting performed during sensing session): It means the phase of transmitting sensing signal to identify target and receiving and measuring the signal that passed through target. One cycle of this step can be defined as a sensing session.
4) Tear down: The STA resets the negotiated role and parameters, and may go through a negotiation process to start the sensing session again.

In this specification, the role of Sensing STA is defined as follows.

Sensing initiator: STA initiating a WLAN sensing session

Sensing responder: STA participating in the WLAN sensing session initiated by the sensing initiator Sensing transmitter: STA that transmits a PPDU used for sensing measurements in a sensing session Sensing receiver: STA that receives the PPDU transmitted by the sensing transmitter and performs sensing measurement.

In this specification, the focus is on the negotiation phase and the sensing phase, and the operation in the sensing phase may vary according to the negotiation phase.

A designation (or name) in this specification may be changed, and the STA may include an AP STA or a non-AP STA. In addition, an STA capable of sensing is referred to as a SENS STA.

Negotiation phase can be done through exchange by defining a new negotiation frame like ADDBA request/response frame for existing BA (Block Acknowledgment) agreement.

In this specification, a frame transmitted by an STA starting negotiation is referred to as a SENS request frame, and a frame transmitted by an STA responding thereto is referred to as a SENS response frame. In addition, a SENS STA transmitting a SENS Request frame is referred to as a SENS RQSTA, and a SENS STA transmitting a SENS Response frame is referred to as a SENS RPSTA.

The SENS Request frame can be defined as a control frame such as RTS/CTS or an action frame such as ADDBA Request/Response. FIG. 11 shows an example defined as an action frame. Details on control role/parameter and timeout will be mentioned later.

FIG. 11 shows an example of a sensing action frame.

Referring to FIG. 11, if the Category is 1 and the Code is 32, the action frame is used for WLAN Sensing. If the Sensing Action value is 0, it becomes the Sensing Request frame. If the Sensing Action value is 1, it becomes the Sensing Response frame.

<Negotiation Procedure>

Figure 12:
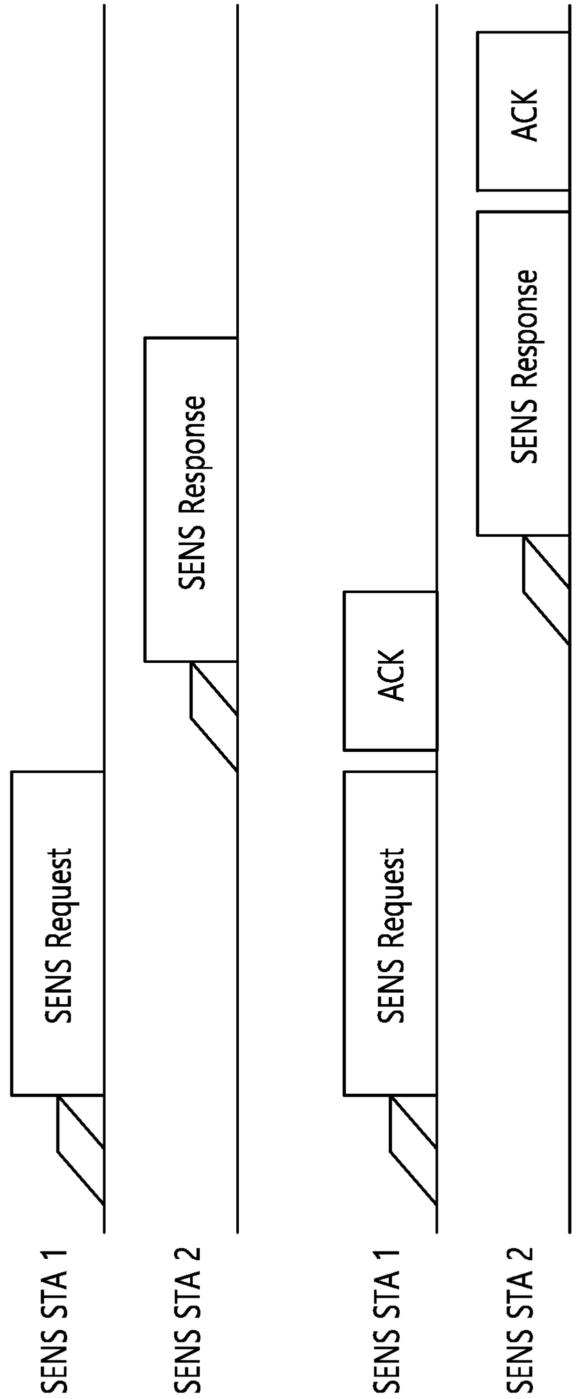
FIG. 12 shows an example of exchange of Basic SENS Request/Response frames.

FIG. 12 shows an example of exchange of Basic SENS Request/Response frames.

As shown in FIG. 12, basically, when SENS STA 1 transmits a SENS Request, SENS STA 2 responds with a SENS Response and conducts negotiation for sensing. In addition, it may respond with ACK for each frame. In addition, if the SENS RPSTA performs processing in SIFS and can respond to negotiation, it may respond with SENS Response after receiving SIFS of SENS Request frame.

The methods described below are explained except for the part that responds with ACK by default and SENS Response transmission after SIFS, and may include response using ACK and SENS Response transmission after SIFS.

Based on FIG. 12, there may be the following SENS request/response frame exchange method regarding which STAs perform negotiation and how to perform the negotiation according to the environment in which the SENS STA exists, but is not limited thereto.

Basically, there may be a method of transmitting a SENS Request independently to each SENS STA and a method of transmitting a SENS Request to a plurality of SENS STAs in a broadcast/multicast manner. This transmission method can be indicated in the form of a mode in the SENS Request, but it can be determined whether it is an individually addressed frame or a broadcast by looking at the RA (Receiver Address) implicitly. In addition, if only one of these transmission methods is fixed, the mode may not be indicated. For example, if mode is indicated with 1 bit, if mode=1, it can be indicated by broadcast, and if mode=0, it can be indicated by unicast. In the embodiment described below, the mode is not separately indicated, but each SENS Request may include this mode indicator.

Also, although 1) method and 2) method are separately explained below, they can be applied together during the negotiation process. For example, depending on the channel condition, it may be independently transmitted to SENS STAs at the initial stage of negotiation, and then transmitted to multiple SENS STAs by switching the transmission mode.

Figure 13:
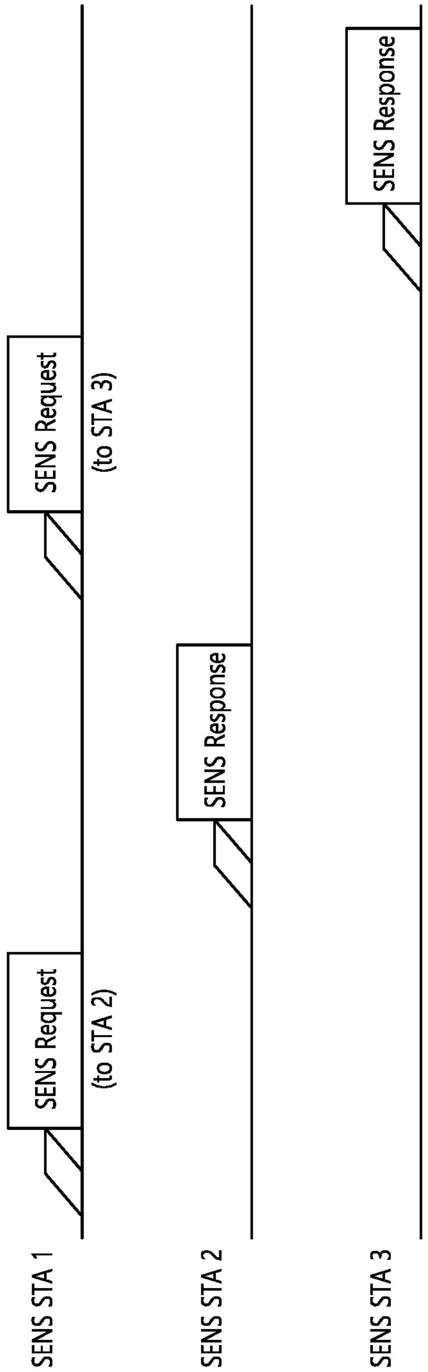
FIG. 13 shows Example 1) of independently transmitting SENS Requests to SENS STAs in one BSS.

FIG. 13 shows Example 1) of independently transmitting SENS Requests to SENS STAs in one BSS.

1) SENS Request is sent independently (unicast) to SENS STAs that it is aware of (e.g. SENS STAs in one BSS).

Referring to FIG. 13, SENS RQSTA (STA 1) transmits a SENS Request to STA 2 and STA 3, respectively, and receives a SENS Response frame.

This method can reliably perform negotiation for each STA, but the delay and signaling overhead increase as the number of SENS STAs increases. A method for solving this is as follows, and is also described in method 2), but is not limited thereto.

1-1) SENS RQSTA does not transmit SENS Request by itself after a certain time

SENS RQSTA can reduce the request, but other SENS STAs cannot recognize whether the SENS Request frame is no longer coming.

Figure 14:
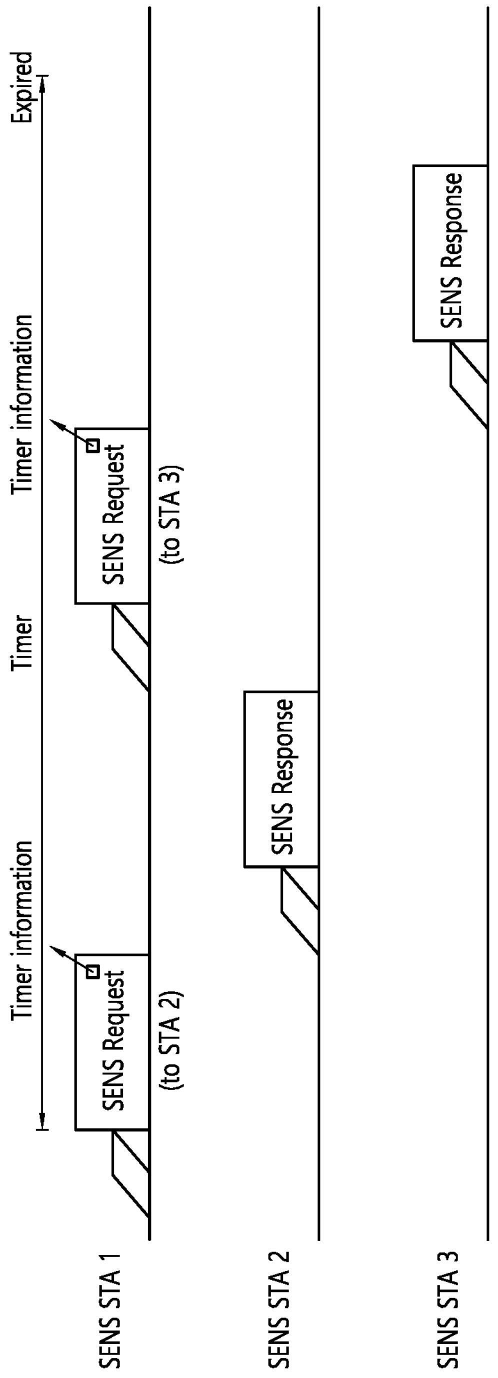
FIG. 14 shows Example 1-2) in which a SENS Request is transmitted until expiration by operating a timer.

FIG. 14 shows Example 1-2) in which a SENS Request is transmitted until expiration by operating a timer.

1-2) Using Timer

At or after the first SENS Request transmission, the Timer is operated to inform that the SENS Request will be transmitted until expiration. Therefore, this Timer information needs to be included in the SENS Request frame.

Referring to FIG. 14, SENS RQSTA (STA 1) indicates timer information in the SENS Request frame transmitted to SENS STA 2 and operates the timer. SENS RQSTA (STA 1)

indicates Timer information remaining in the SENS Request frame transmitted to STA 3. Through this, other SENS STAs can know until when the SENS RQSTA will transmit the SENS Request.

Figure 15:
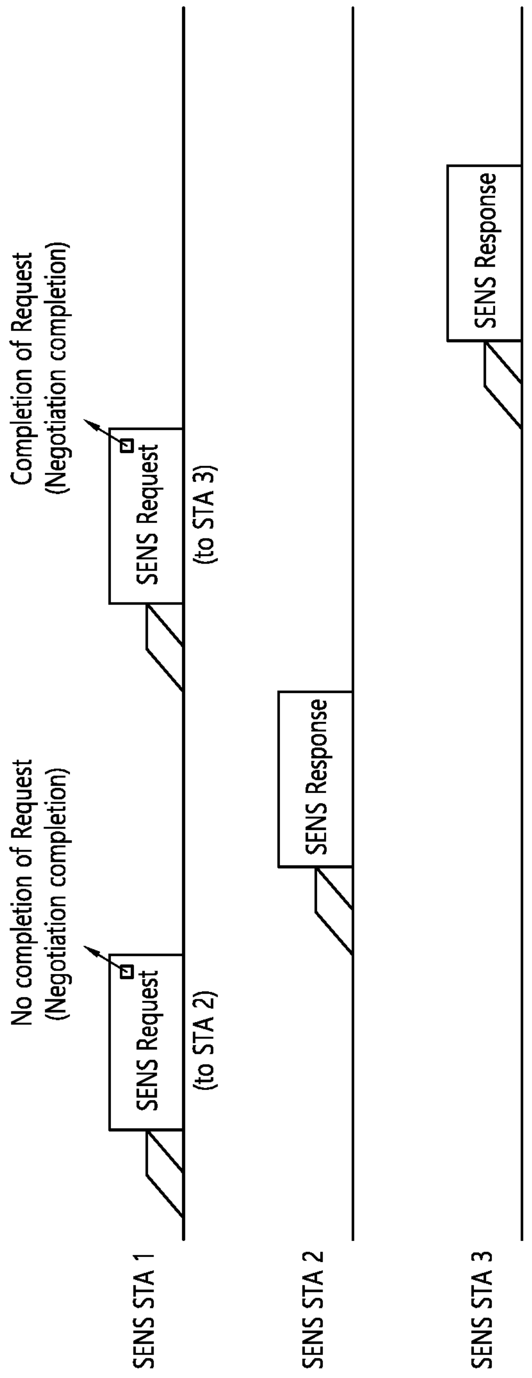
FIG. 15 illustrates Example 1-3) of notifying other STAs that the SENS Request frame is no longer transmitted.

FIG. 15 illustrates Example 1-3) of notifying other STAs that the SENS Request frame is no longer transmitted.

1-3) Announce Negotiation completion

Announce that the SENS Request frame is no longer transmitted to other STAs. An explicit indication can be given to the last SENS Request frame or a new SENS completion frame can be transmitted.

Referring to FIG. 15, SENS STA 1 includes an explicit indication that negotiation is complete in the last SENS Request frame transmitted to STA 3.

Figure 16:
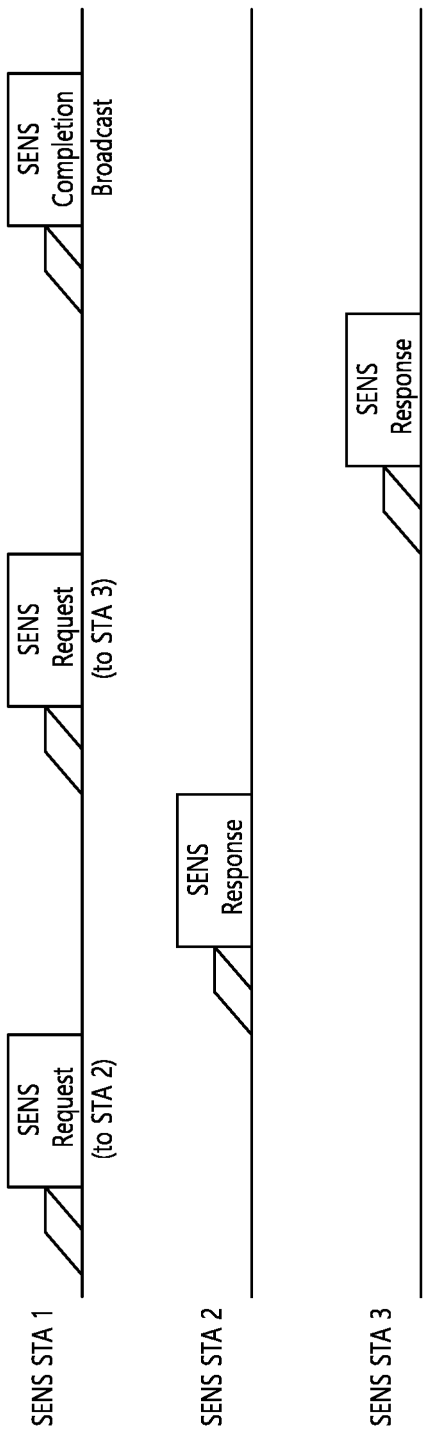
FIG. 16 illustrates Example 1-3) in which a SENS Completion frame is transmitted to notify completion of negotiation.

FIG. 16 illustrates Example 1-3) in which a SENS Completion frame is transmitted to notify completion of negotiation.

Referring to FIG. 16, SENS STA 1 transmits all SENS Request frames to intended SENS STAs, and then transmits a SENS Completion frame to notify completion of negotiation.

In the Timer method, the number of STAs that can participate in the sensing session may vary depending on the channel situation, but in this method, the SENS RQSTA can terminate negotiation by announcing when desired.

Each of the methods described above may operate separately, but more than one method may operate together. For example, while the timer is running, the SENS STA may announce negotiation completion before the timer expires.

Consideration of Failure Cases for Intended SENS RPSTAs

Figure 17:
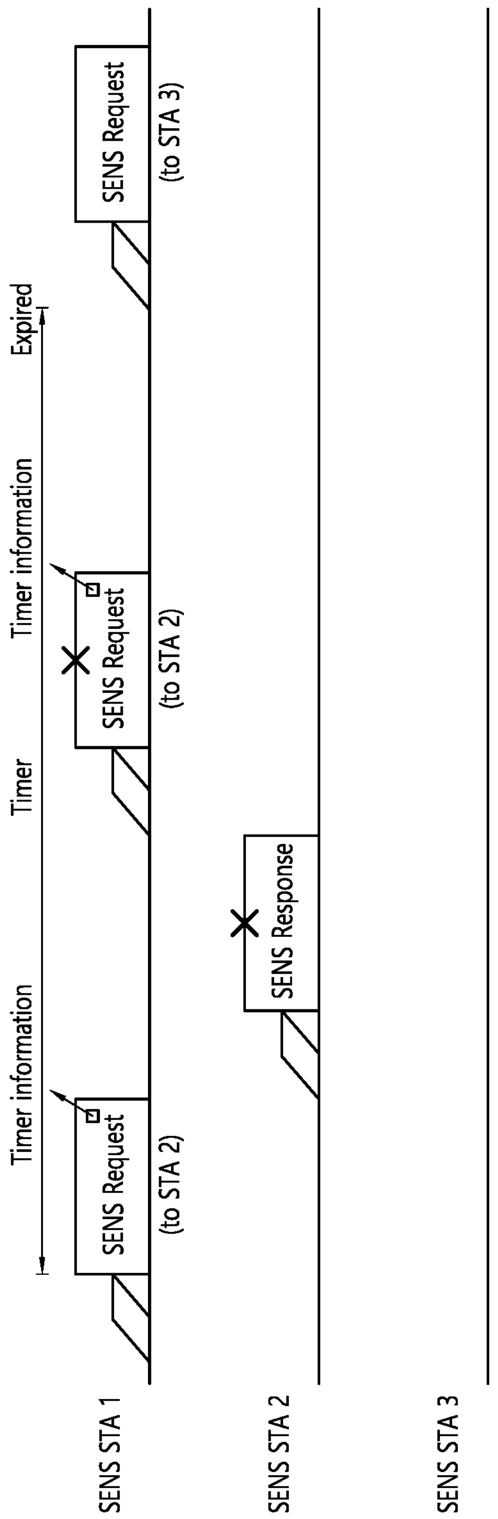
FIG. 17 shows an example of applying a timeout considering a failure case for Intended SENS RPSTAs.

FIG. 17 shows an example of applying a timeout considering a failure case for Intended SENS RPSTAs.

In the above methods, the SENS RPSTA (e.g., STA 2, STA 3) may not receive the SENS Request or the SENS RQSTA (e.g., STA 1) may not receive the transmitted SENS Response. Accordingly, the SENS RQSTA may continuously transmit SENS Requests, which may result in a lengthy entire negotiation process or insufficient STAs participating in sensing due to repeated transmission to the same STA. Therefore, SESN RQSTA may apply an appropriate timeout value for each SENS RPSTA.

Referring to FIG. 17, STA 1 sets a timeout and transmits a SENS Request to STA 2. SENS Response was not transmitted properly in the first transmission, and SENS Request was not transmitted properly in the second transmission. After that, because of the timeout, STA 1 determines that the channel with STA 2 is not good and does not transmit the SENS Request frame to STA 2 any longer.

Consideration of Failure Cases for 3rd Party STAs

Basically, STAs other than the intended receiver need to overhear Negotiation completion information through Timer information or explicit indicators. However, due to issues such as coverage due to channel conditions, we cannot guarantee that this information will always be decoded. So, there may be several ways:

A. Always Send SENS Request and/or SENS Response at Basic Rate (e.g., MCS 0)

The SENS Request/Response frames described above may be transmitted at a high rate rather than a low rate such as MCS 0 according to channel conditions. However, in order to increase the overhearing probability for 3rd part STAs in the negotiation process, transmission may be requested with a fixed basic rate (e.g., the lowest MCS (MCS 0)) for these frames.

Figure 18:
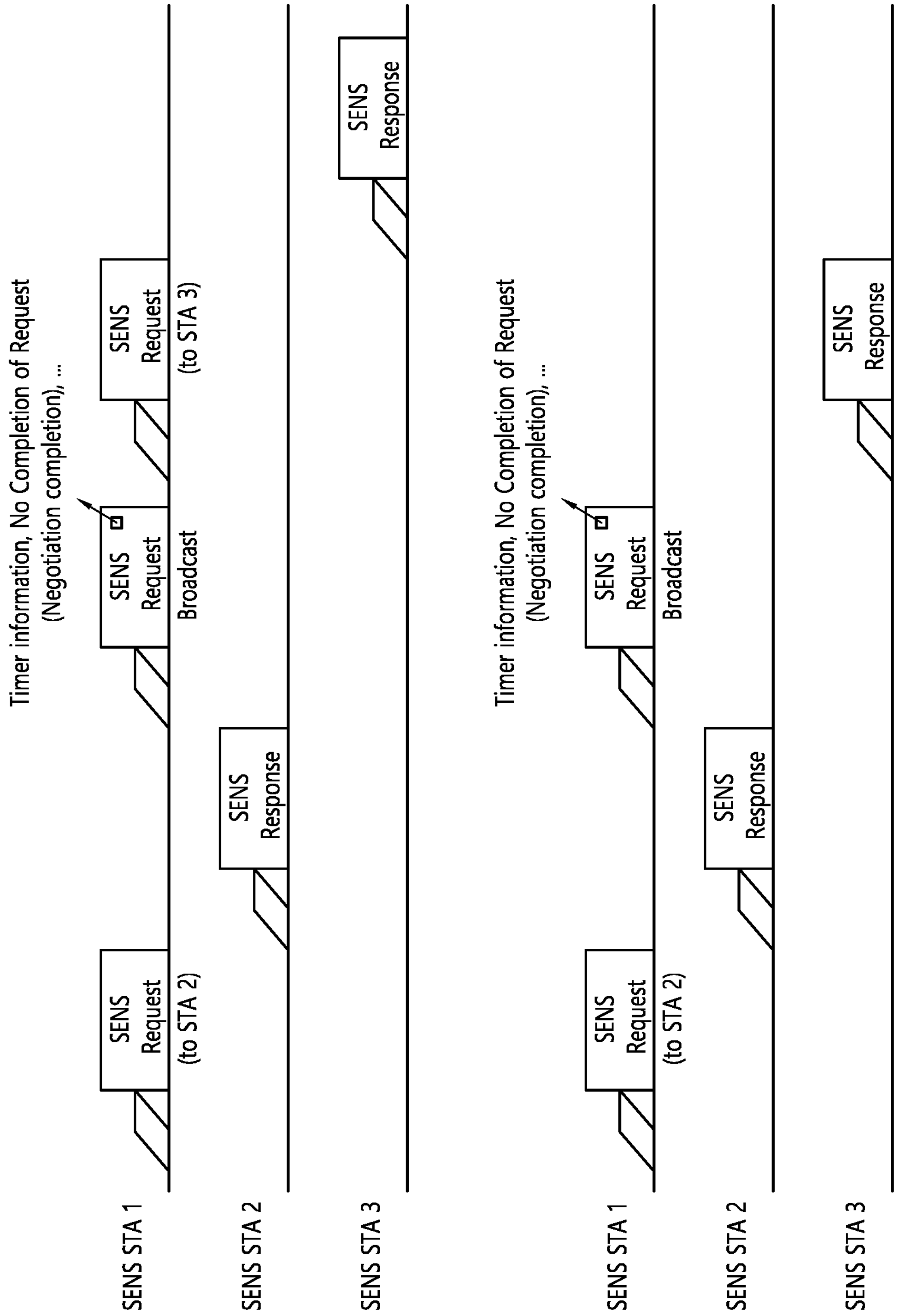
FIG. 18 shows an example of including timer information and negotiation completion information in a Broadcast SENS Request frame.

B. During Negotiation, Broadcast Frame Transmission Including Timer Information and Negotiation Completion Information Using Basic Rate (e.g., MCS 0) to Increase Reliability This broadcast frame can reuse the SENS Request frame, but can also be defined as a new frame. If the SENS Request frame is reused, as shown in the example of FIG. 18, the frame is transmitted only for reliability, that is, transmitted in a mode not to respond to it, as shown in the example below of FIG. 18, it is possible to switch to a mode in which a response is received by transmitting in a broadcast form such as method 2) described later. Details of the method 2) will be described later.

FIG. 18 shows an example of including timer information and negotiation completion information in a Broadcast SENS Request frame.

2) A SENS Request is sent (e.g., broadcast) to a plurality of SENS STAs, and a SENS Response is received for each. Also, one or more SENS Requests may be transmitted.

Figure 19:
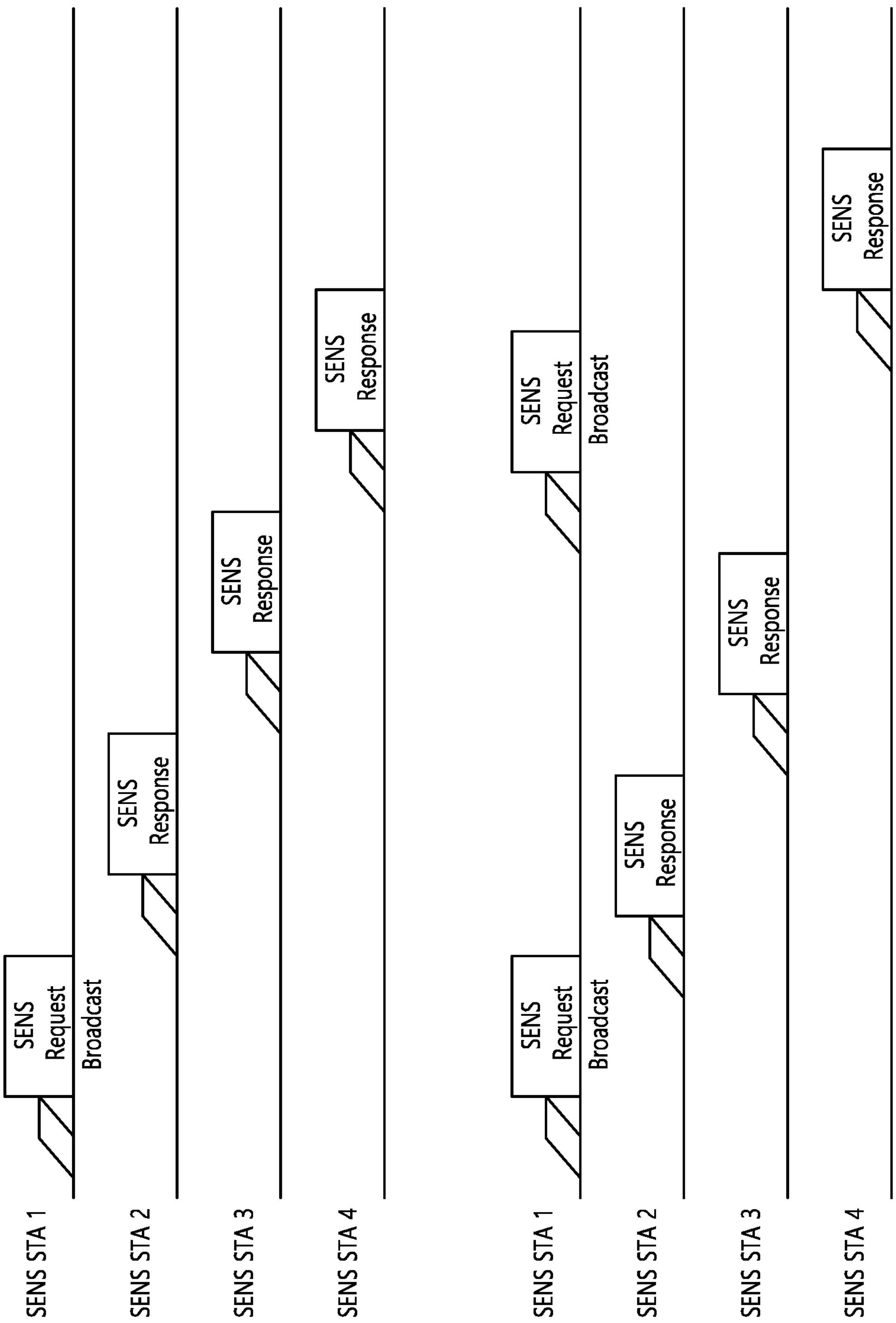
FIG. 19 shows an example of broadcasting a SENS Request to multiple SENS STAs.

FIG. 19 shows an example of broadcasting a SENS Request to multiple SENS STAs.

Referring to FIG. 19, SENS RQSTA (STA 1) receives SENS Response frames from STA 2, STA 3, and STA 4, respectively. As shown in the example below, SENS RQSTA (STA 1) can transmit SENS Request several times to increase reliability. Likewise, in order to increase reliability, transmission may be requested by applying a basic rate (e.g., MCS 0) to the SENS Request and/or the SENS Response frame.

This method may be specifically performed as follows, but is not limited thereto. In particular, methods 1-1), 1-2), and 1-3) described in 1) can be used.

2-1) SENS RQSTA does not transmit SENS Request by itself after a certain time

SENS RQSTA can reduce the request, but other SENS STAs cannot recognize whether the SENS Request frame is no longer coming.

2-2) When sending a SENS request, the STA indicates the STA ID that wants a response SENS RQSTA instructs the STAID that wants a response in the SENS Request frame, and receives a response from the corresponding SENS STA.

Figure 20:
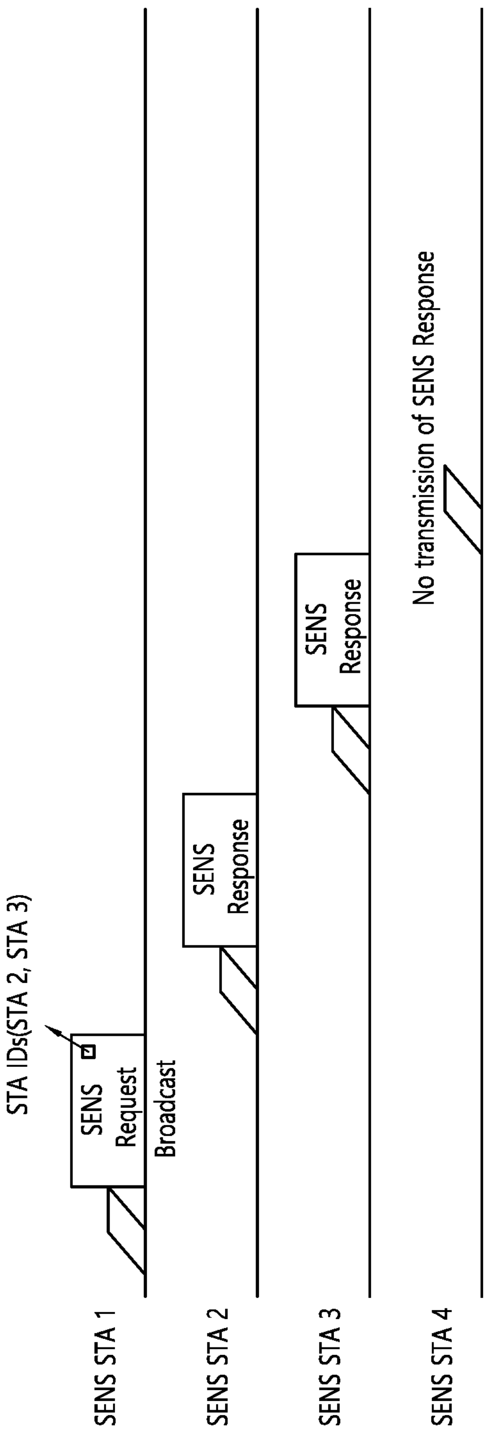
FIG. 20 illustrates Example 2-2) indicating an STA ID for which a response is desired when transmitting a SENS request.

FIG. 20 illustrates Example 2-2) indicating an STA ID for which a response is desired when transmitting a SENS request.

Referring to FIG. 20, SENS RQSTA (STA 1) indicates the IDs of STA 2 and STA 3 in the SENS Request frame and receives SENS Responses from STAs 2 and 3. STA 4 does not transmit a SENS Response because it is not indicated.

In particular, if processing within the SIFS interval is possible using the STA ID, an order can be determined and transmitted sequentially, or OFDMA (Orthogonal Frequency Division Multiple Access) of 11ax can be used.

Figure 21:
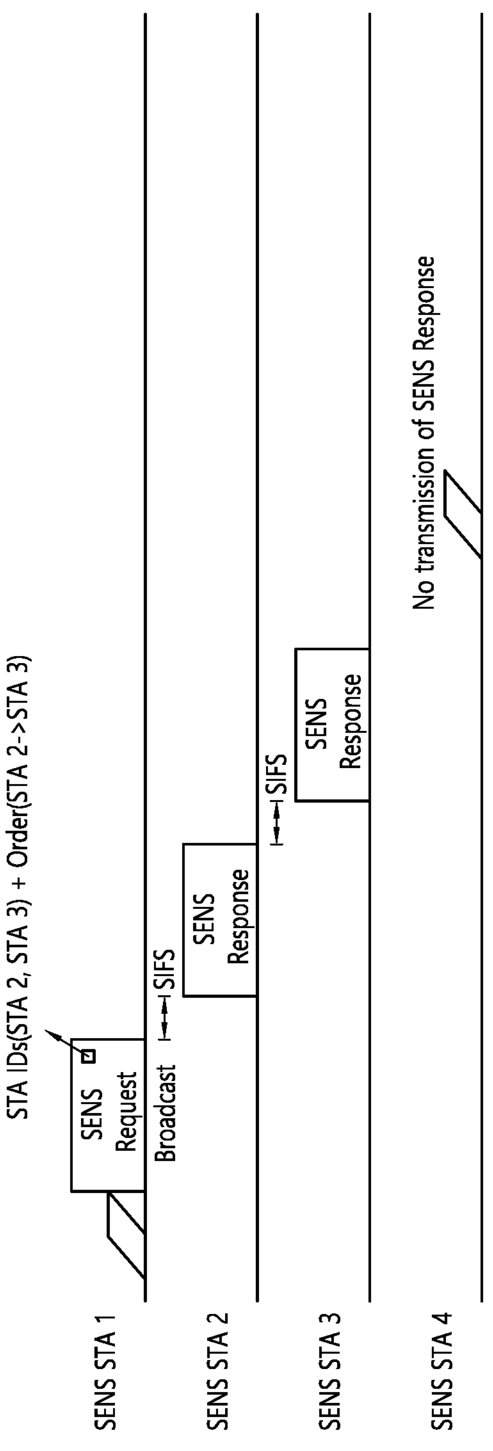
FIG. 21 shows an example of sequential responses at SIFS intervals in Example 2-2).

FIG. 21 shows an example of sequential responses at SIFS intervals in Example 2-2).

Referring to FIG. 21, SENS RQSTA (STA 1) instructs the IDs and response order (STA 2→STA 3) of STA 2 and STA 3 in the SENS Request frame, and receives SENS Responses from them at SIFS intervals. Here, there may be an ACK transmitted by STA 1 after each SENS Response reception SIFS.

Consideration of Failure Cases for SENS RPSTAs

In the above method, the SENS RPSTA (e.g., STA 2, STA 3, and STA 4) may not receive the SENS Request or the SENS RQSTA (e.g., STA 1) may not receive the transmitted SENS Response. Therefore, transmission of the SIFS interval may not operate correctly. To solve this, PIFS recovery can be used or back-off can be performed again. That is, as in the example of FIG. 22, if a response does not come during PIFS after the response of STA 2, the SENS Request is sent again or, as in the example below, after the response of STA 2, when the timeout for the response is reached, SENS Request is sent again through back-off.

Figure 22:
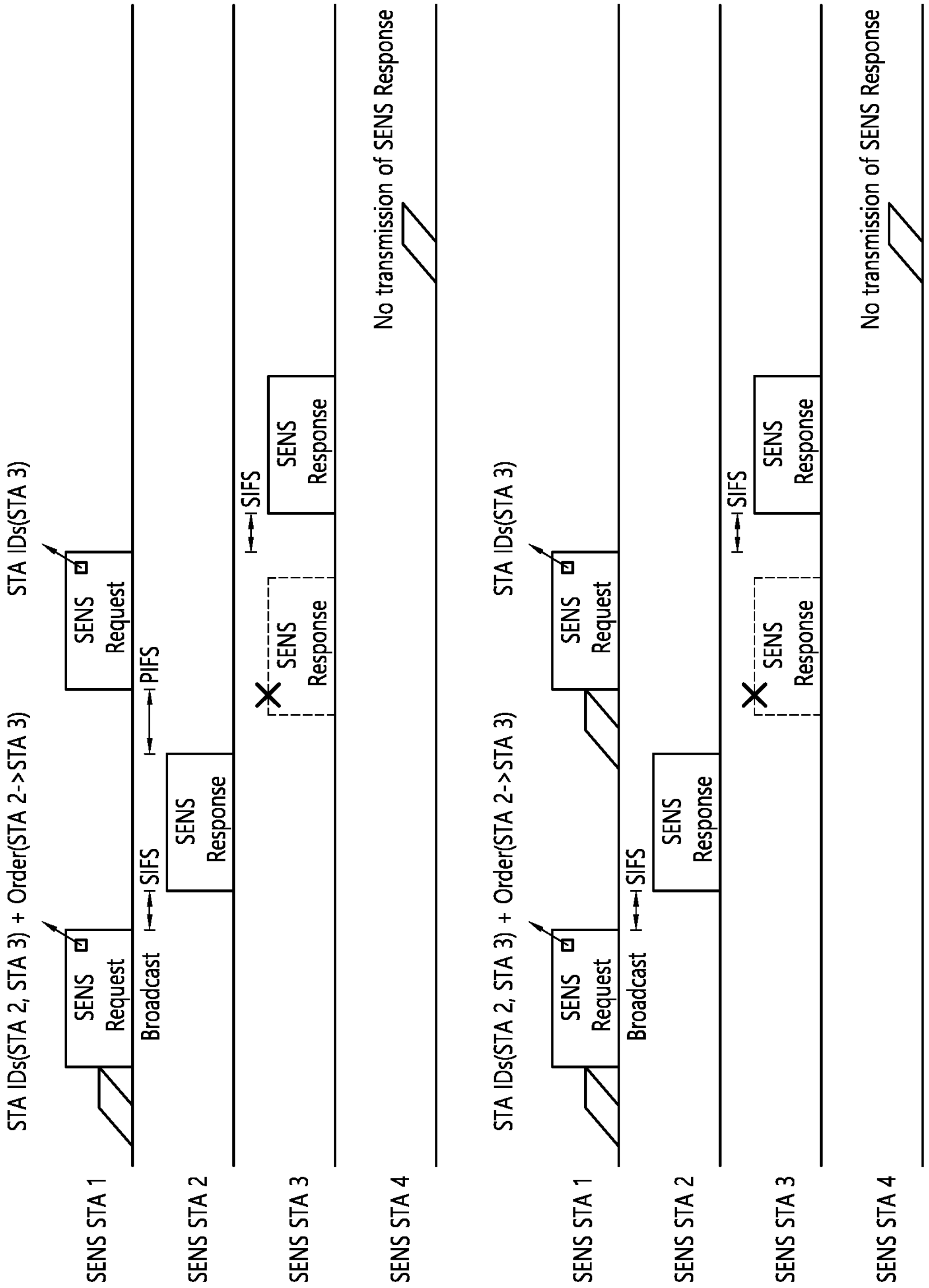
FIG. 22 shows an example in which failure cases are considered in the method using SIFS in Example 2-2).

FIG. 22 shows an example in which failure cases are considered in the method using SIFS in Example 2-2).

Figure 23:
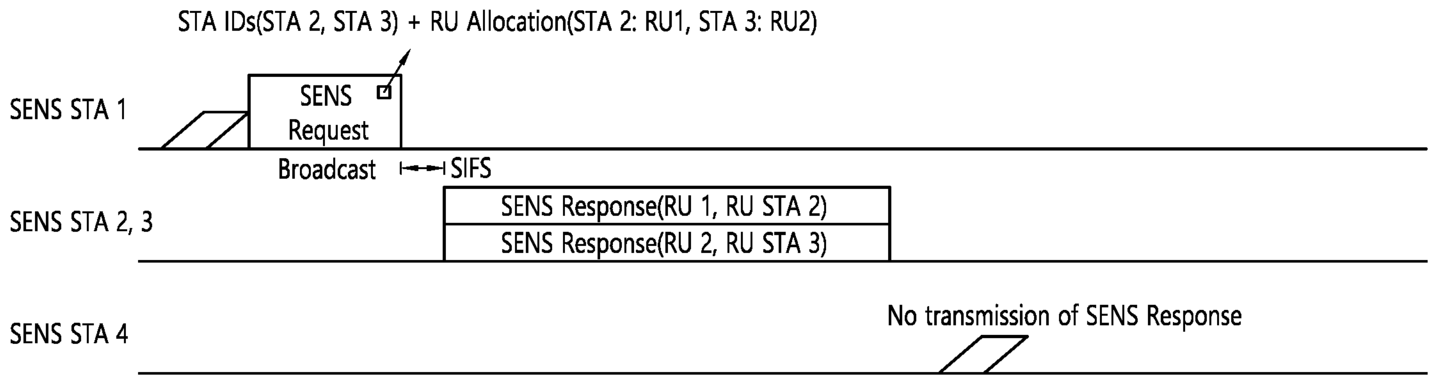
FIG. 23 shows an example of an OFDMA response of a SIFS interval in Example 2-2).

FIG. 23 shows an example of an OFDMA response of a SIFS interval in Example 2-2).

Referring to FIG. 23, if STAs 1, 2, and 3 are STAs with at least 11 ax capability, SENS RQSTA (STA 1) indicates IDs and RU allocation information of STAs 2 and STA 3 in the SENS Request frame, SENS Response is received from each RU allocated from them. Here, the SENS Request frame may be a new trigger frame or a trigger frame of a new trigger type.

2-3) Set a timer to receive SENS response when sending SENS request

As in 1), since the delay until receiving a response for all SENS STAs can be long, a timer can be set.

Figure 24:
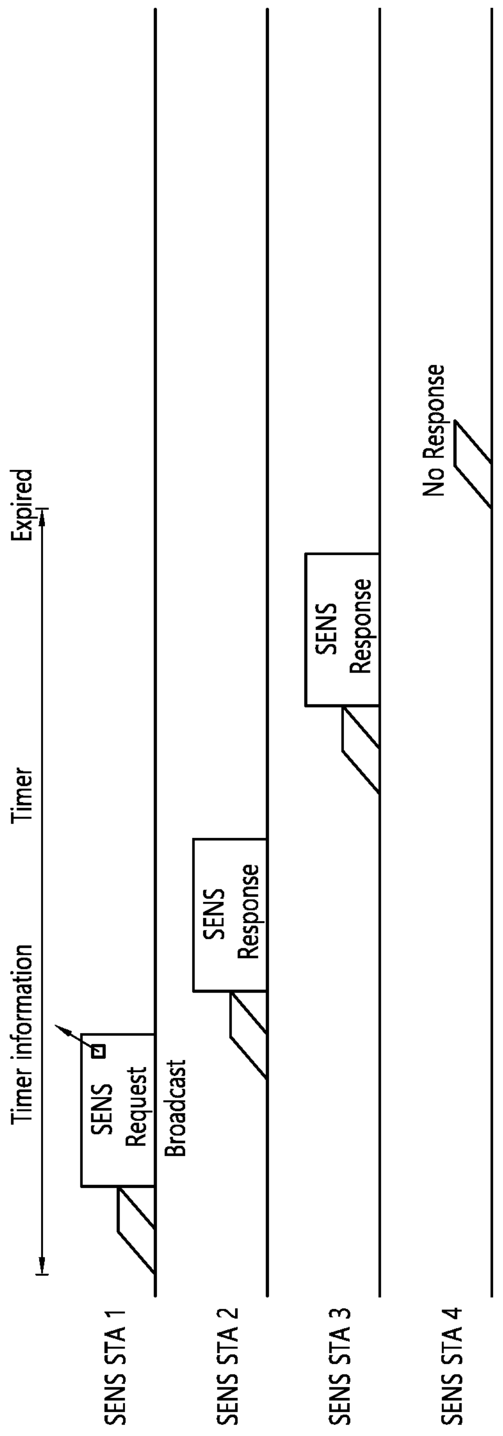
FIG. 24 shows an example of setting a timer for receiving a response to a SENS STA.

FIG. 24 shows an example of setting a timer for receiving a response to a SENS STA.

Referring to FIG. 24, SENS RQSTA (STA 1) indicates Timer information in the SENS Request frame and operates the Timer. Through this, other SENS STAs can know until when the SENS RQSTA will transmit the SENS Request. Therefore, after the timer is completed, STA 4 does not transmit a SENS Response.

2-4) Announce SENS completion

Announce that the SENS Request frame is no longer transmitted to other STAs. A new SENS completion frame may be transmitted or an explicit indicator indicating that negotiation is complete may be included in the SENS Request frame.

Figure 25:
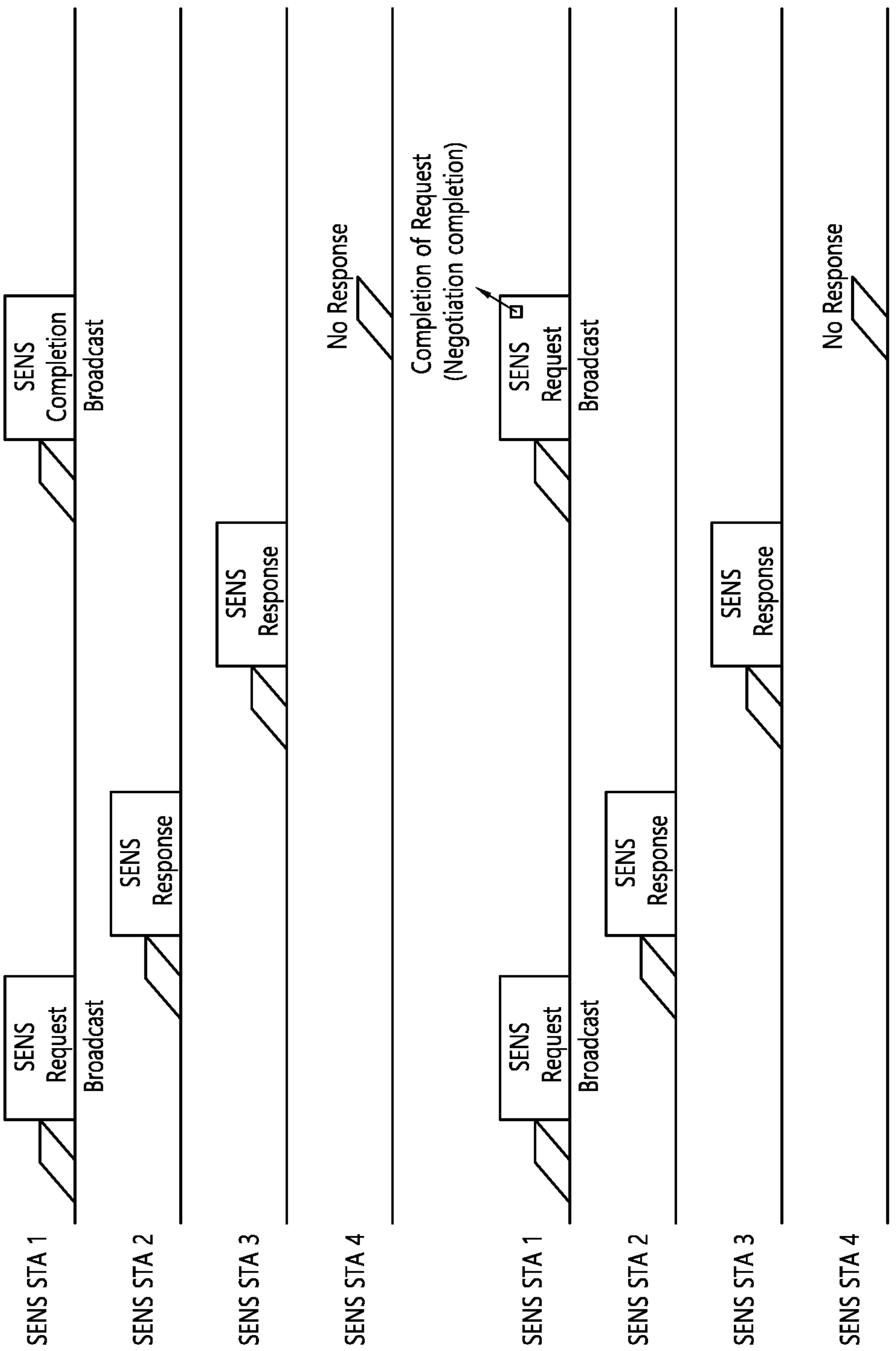
FIG. 25 shows Example 2-4) including an explicit indicator indicating that a new SENS completion frame is transmitted or negotiation is completed in the SENS Request frame.

FIG. 25 shows Example 2-4) including an explicit indicator indicating that a new SENS completion frame is transmitted or negotiation is completed in the SENS Request frame.

Referring to FIG. 25, if SENS STA 1 determines that negotiation has been sufficiently completed, it notifies that negotiation has been completed through a SENS Completion frame or an explicit indicator. STA 4 receives this frame and does not respond.

Each of the methods described above may operate separately, but more than one method may operate together. For example, the STA may announce negotiation completion before the timer expires even though the timer is running.

<Role Negotiation>

During negotiation or other phases, it is necessary to define the four roles described above among SENS STAs.

Sensing initiator and Sensing responder

In the simplest way, the sensing initiator can be assumed by the STA that transmitted the SENS Request frame. That is, SENS RQSTA becomes a sensing initiator. This does not require the signaling overhead of specifying separate initiators and responders. In addition, since one SENS STA basically serves as a sensing initiator, when the initiator is determined, the remaining SENS STAs become sensing responders.

This role negotiation method may vary depending on the unicast method and broadcast method of SENS Request frame transmission.

1) In case of broadcast method 1-1) Mode setting

This role can be divided into modes depending on which role the SENS Initiator and Responder perform between the transmitter and receiver roles. For example, modes can be classified as follows, but are not limited thereto.

Mode 1: SENS RQSTA becomes a transmitter, and SENS RPSTAs become receivers.

Mode 2: SENS RQSTA becomes a receiver, and SENS RPSTAs become transmitters

The corresponding mode may be indicated in the SENS Request frame and/or SENS Response frame. If there are two modes, it can be operated with 1 bit, for example, 1 for Mode 1 and 0 for Mode 2. If more modes exist, the number of bits for indicating them may increase.

This method of designating two modes can reduce signaling overhead, but it is not easy to determine several sensing transmitters or sensing receivers including SENS RQSTA.

Figure 26:
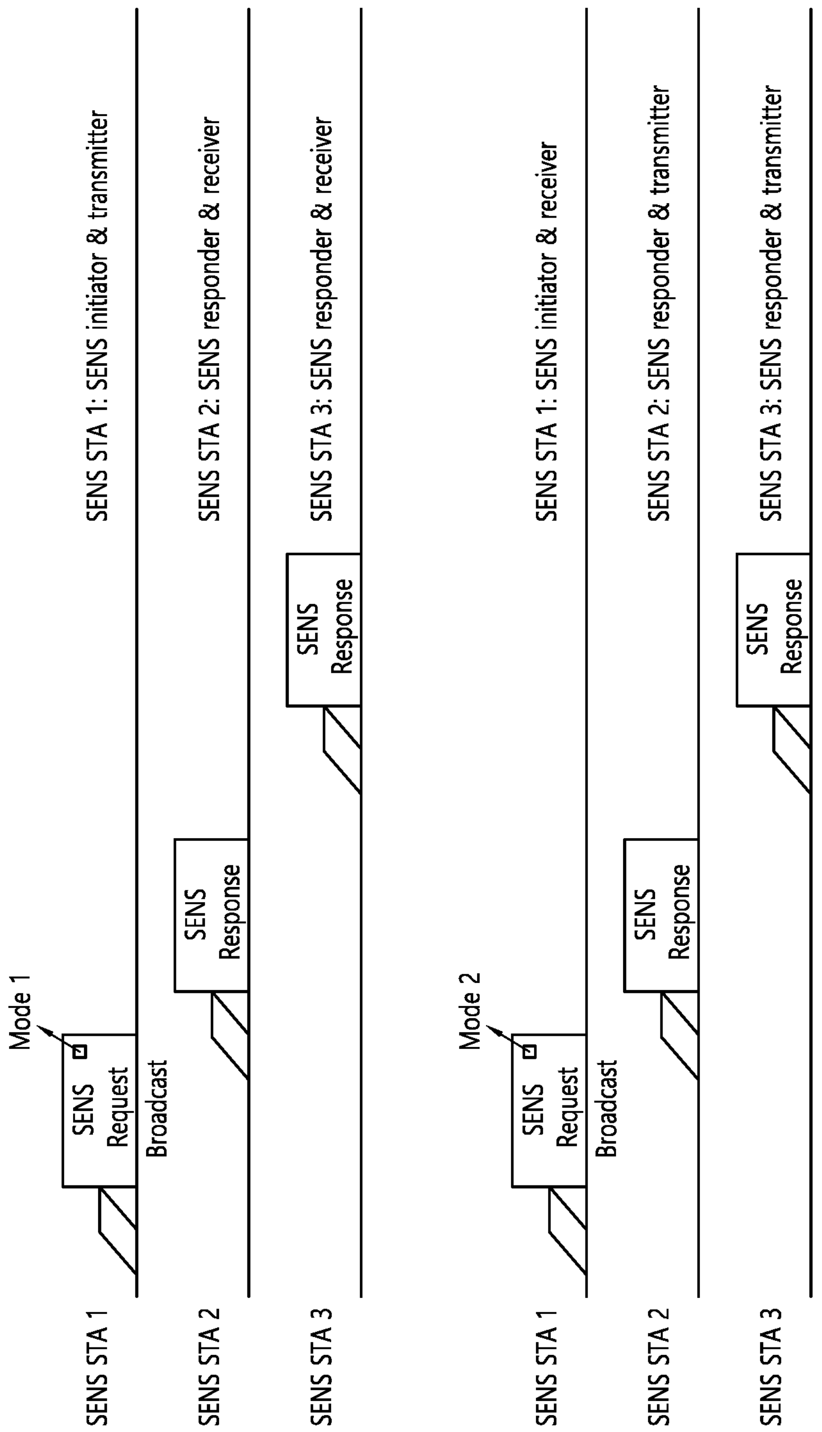
FIG. 26 shows an example of role negotiation based on the 1-1) method.

FIG. 26 shows an example of role negotiation based on the 1-1) method.

Referring to FIG. 26, if SENS RQSTA (STA 1) indicates Mode 1 in the SENS Request frame, and STA 2 and STA 3 respond to this, STA 1 becomes a SENS initiator and transmitter at the same time. On the other hand, STA 2 and STA 3 are responders and receivers at the same time.

In addition, if SENS RQSTA (STA 1) indicates Mode 2 in the SENS Request frame, and STA 2 and STA 3 respond to this, STA 1 becomes a SENS initiator and receiver at the same time. On the other hand, STA 2 and STA 3 become responders and transmitters at the same time.

Although the above example shows an example indicated by SENS RQSTA (STA 1), SENS RPSTA (STA 2, 3) may also indicate Mode 1 or Mode 2 in the SENS Response frame in response.

The example above shows how the transmitter and receiver are set to mode ½ by the SENS initiator. However, there may be methods for more dynamic role negotiation.

1-2) With mode indication, role is determined with additional STA identification instructions If SENS RQSTA indicates a mode and additionally indicates an STA ID, STAs corresponding to the STA ID perform the same role as SENS RQSTA. For example, as shown in FIG. 20, if the ID of STA 2 is additionally indicated in Mode 1, since STA 1 is a sensing transmitter in Mode 1, STA 2 also becomes a sensing transmitter. In the case of mode, if the ID of STA 3 is additionally indicated, STA 3 becomes a receiver because STA 1 is a sensing receiver in mode 2.

Figure 27:
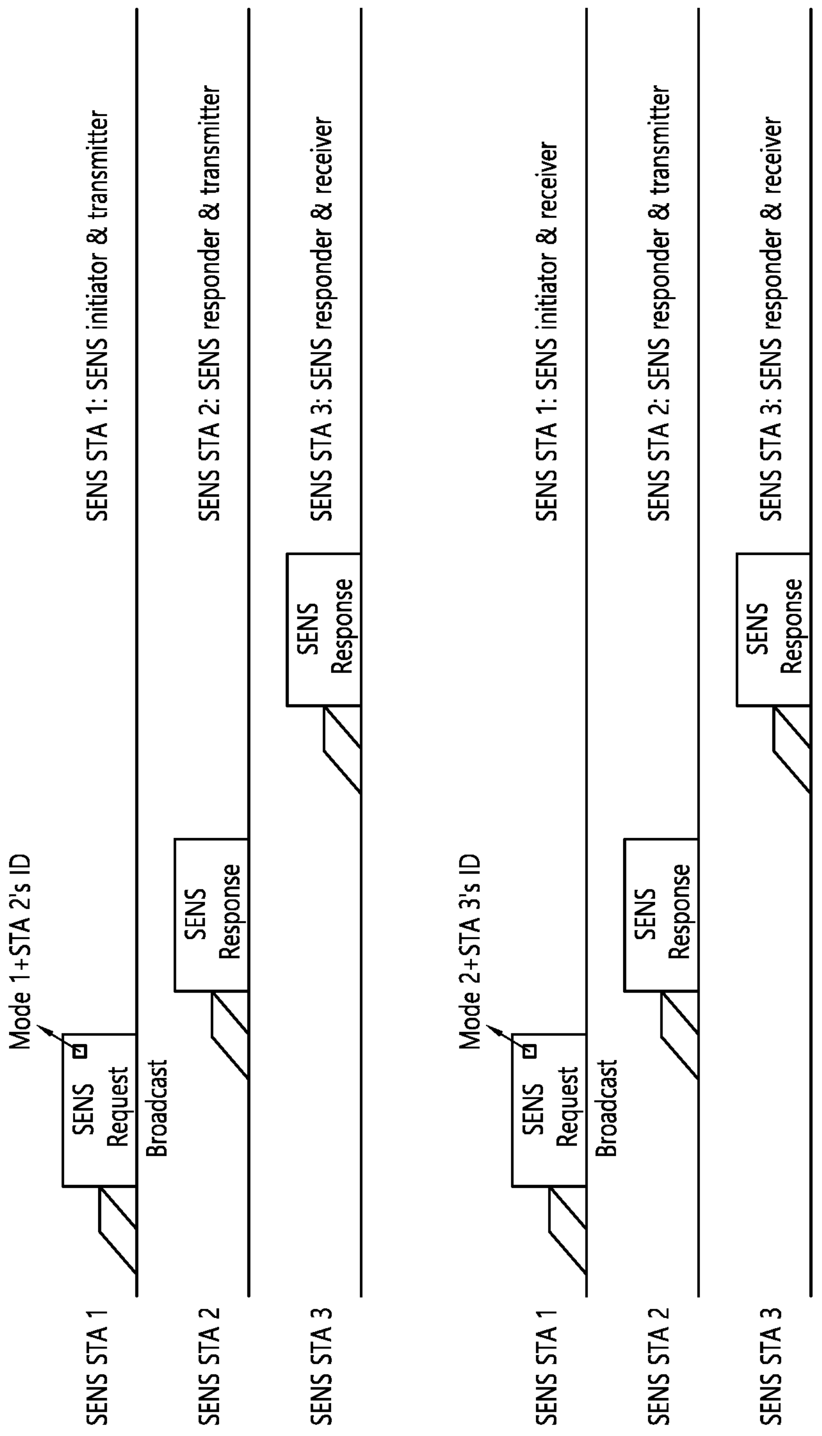
FIG. 27 shows an example of role negotiation based on the 1-1) method.

FIG. 27 shows an example of role negotiation based on the 1-1) method.

Referring to FIG. 27, if SENS RQSTA indicates a mode and additionally indicates an STAID, STAs corresponding to the corresponding STA ID perform the same role as an initiator. For example, as shown in FIG. 26, if the ID of STA 2 is additionally indicated in the case of Mode 1, since STA 1 is a transmitter in Mode 1, STA 2 also becomes a transmitter. In the case of mode, if the ID of STA 3 is additionally indicated, since STA 1 is a receiver in mode 2, STA 3 becomes a receiver.

After all, when the methods 1-1) and 1-2) are comprehensively considered, the field can be configured as follows, and FIGS. 26 and 27 show the sensing response through back-off, but methods such as the Sensing Response transmission of FIGS. 21 and 23 described above may also be used.

A. STA ID List and Role Bitmap

Each STA ID is indicated, and then a bitmap corresponding to each STA indicates whether it is a transmitter (e.g., 1) or a receiver (e.g., 0). Here, the Bitmap can be parsed through the explicit Number of STAs indication, but the Number of STAs is not necessarily required because it can be inferred through the STA ID List.

The role bitmap may be configured in units of 8 bits for decoding, or may be configured as many as the number of STAs included in the STA ID List. However, basically, the bitmap is composed of 8-bit units as before, which is stable in terms of decoding. Meanwhile, in order to explicitly indicate the Bitmap size, the Bitmap size may be used instead of the Number of STA. For example, when the unit is 8 bits, a value of 2 is 16 bits, and a value of 1 is 8 bits.

B. Tuple <STA ID, Role>

That is, the role (transmitter or receiver) can be indicated through 1 bit behind the STA ID without configuring the bitmap separately above. As in A, the Number of STAs can be specified here, but it is not necessary because it can be inferred from the number of tuples.

C. STA ID List+Overall Role

In methods A and B, the role of each STA is flexibly indicated, but in Sensing, if the roles of the initiator and responder are always different, the role can be indicated with 1 bit. For example, if the initiator indicates a value of 1 to the transmitter, all responders that receive and respond become transmitters, and the initiator becomes a receiver.

Figure 28:
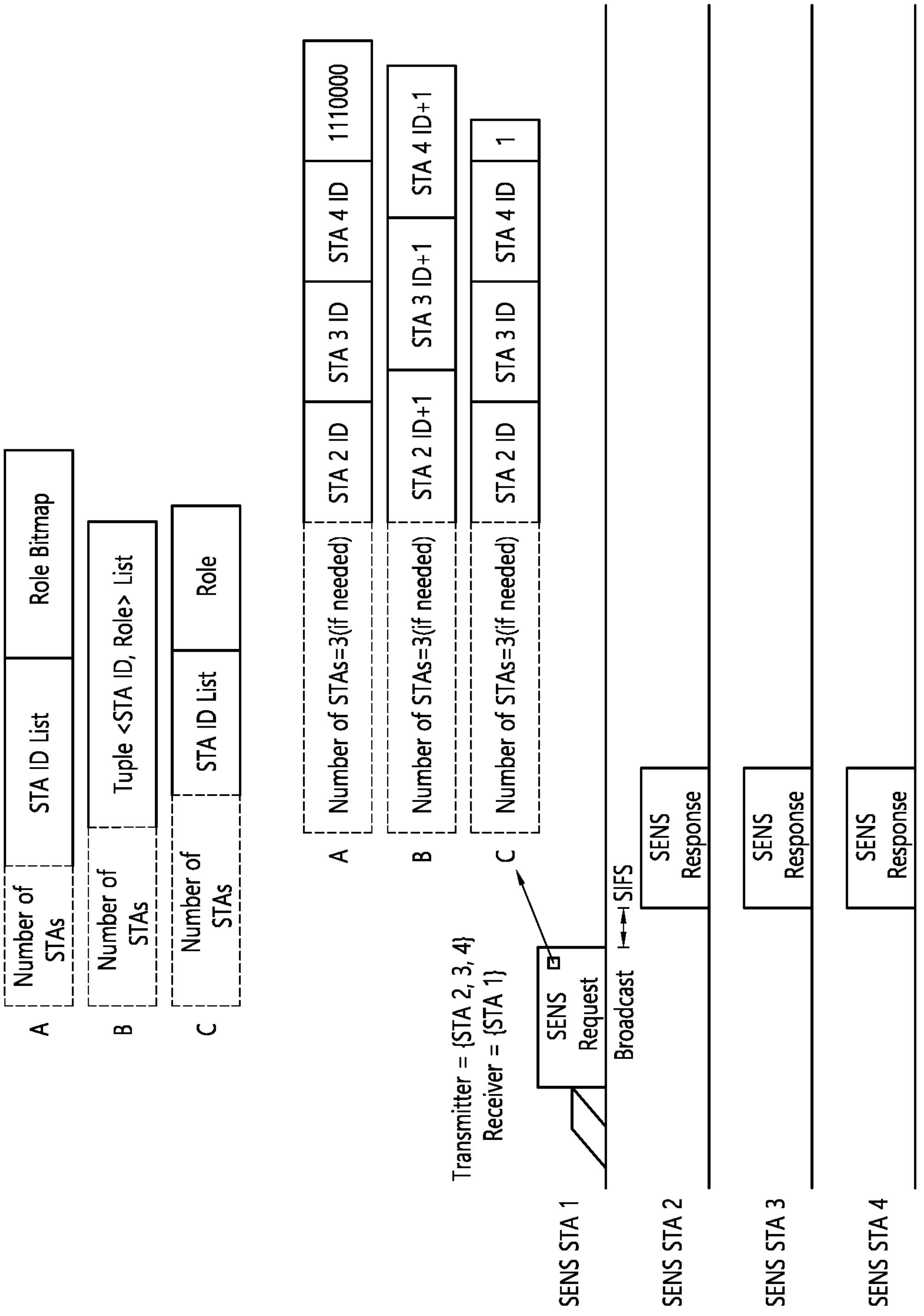
FIG. 28 illustrates a method of indicating a role according to methods A, B, and C.

FIG. 28 illustrates a method of indicating a role according to methods A, B, and C.

Referring to FIG. 28, STA 1, which is an initiator, determines the role of each STA 2, 3, and 4 through a Sensing Request. At this time, if STAs 2, 3, and 4 simultaneously transmit for OFDMA/MIMO, etc., it is possible to check whether each STA is currently capable of sensing (e.g., whether the channel is IDLE) through whether or not transmission is performed. In this example, the Sensing Request frame announces that STAs 2, 3, and 4 are the Sensing Transmitter and STA 1 is the Receiver. In method A, since there are three STAs using each STA's ID and an 8-bit bitmap, the first 3 bits are indicated as 1 and the rest are reserved. Method B uses an STA ID and 1 bit (each value is 1) for each STA, and method C indicates the STA ID first and then indicates 1 bit that STAs 2, 3, and 4 are transmitters.

Figure 29:
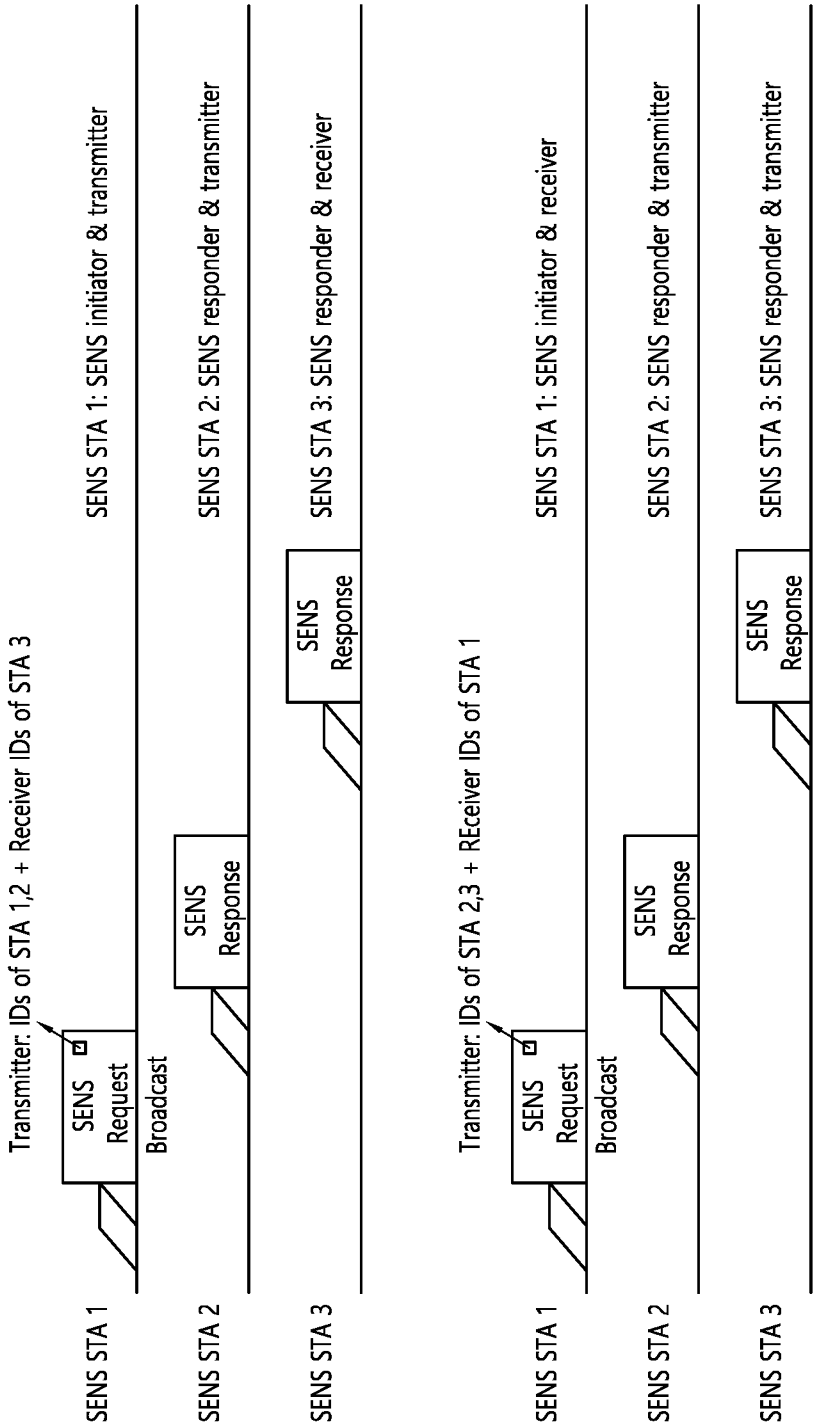
FIG. 29 shows an example of role negotiation based on the method 1-3).

1-3) Without mode indication, role is determined by STA identification instruction FIG. 29 shows an example of role negotiation based on the method 1-3).

Referring to FIG. 29, SENS RQSTA indicates a role for each STA ID. For example, as in the example of FIG. 26, the transmitter indicates the IDs of STAs 1 and 2, and the receiver indicates the ID of STA 3 to determine the role.

Although FIG. 29 shows the sensing response through back-off, the same method as the sensing response transmission of FIGS. 21 and 23 described above can also be used.

2) In case of Unicast method 2-1) Mode setting

Like the 1-1) method, the mode can be set. For example, modes can be classified as follows, but are not limited thereto.

Mode 1: SENS RQSTA becomes a transmitter, and SENS RPSTA becomes a receiver.

Mode 2: SENS RQSTA becomes a receiver, and SENS RPSTA becomes a transmitter.

Mode 3: SENS RQSTA becomes a transmitter, and SENS RPSTA becomes a transmitter.

Mode 4: SENS RQSTA becomes a receiver, and SENS RPSTA becomes a receiver.

The corresponding mode may be indicated in the SENS Request frame and/or SENS Response frame. If there are 4 modes, 2 bits, for example, 00 can operate as Mode 1, and 11 as Mode 4. If more modes exist, the number of bits to indicate them may increase.

Figure 30:
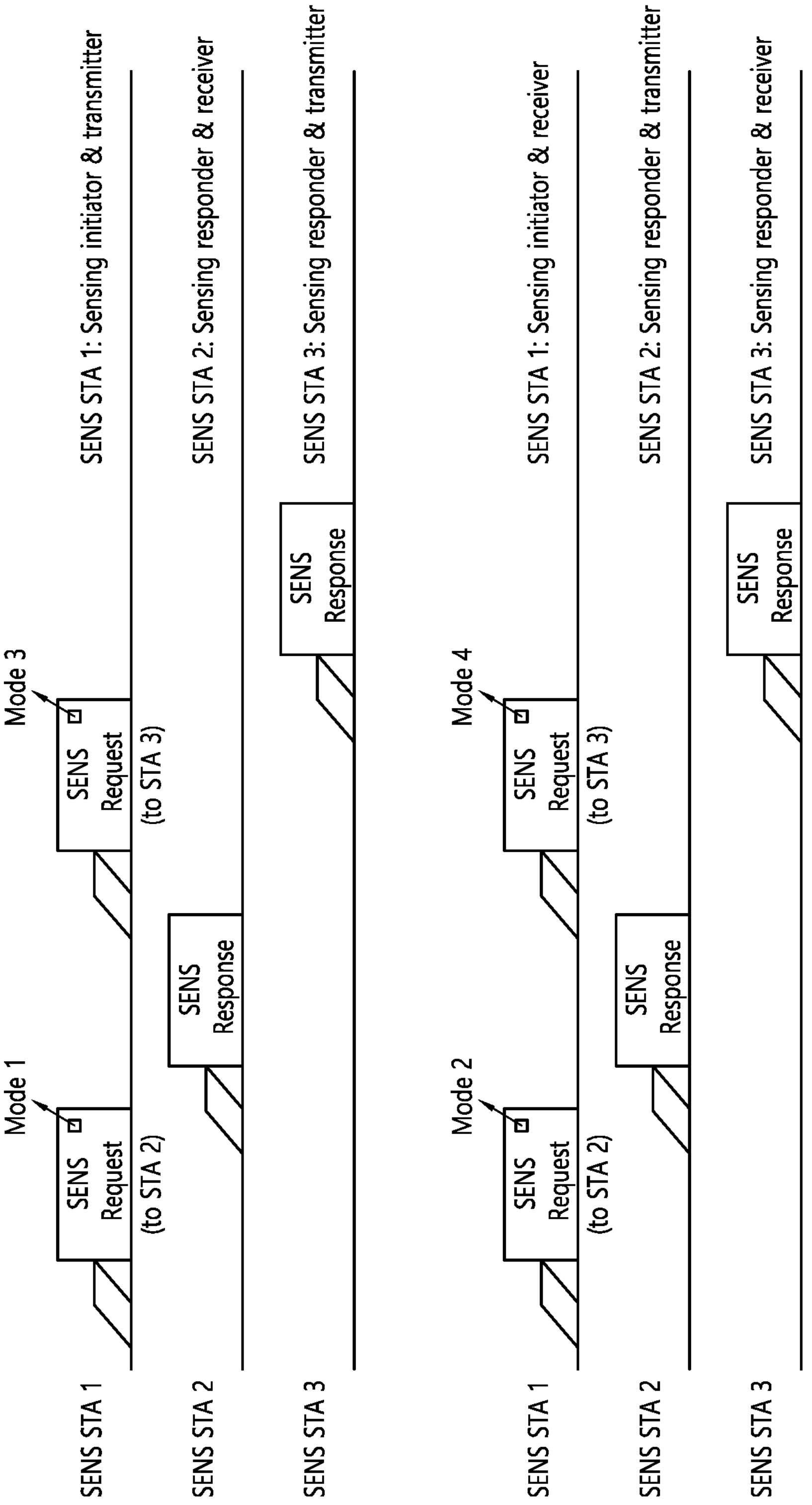
FIG. 30 shows an example of role negotiation based on the 2-1) method.

FIG. 30 shows an example of role negotiation based on the 2-1) method.

Referring to FIG. 30, SENS RQSTA (STA 1) indicates STA 2 to Mode 1 and STA 3 to Mode 3 in the SENS Request frame, and if STA 2 and STA 3 each respond, STA 1 is a sensing initiator and become a transmitter. On the other hand, STA 2 becomes a sensing responder and receiver, and STA 3 becomes a responder and a sensing transmitter like STA 1 at the same time.

In addition, if SENS RQSTA (STA 1) indicates Mode 2 in the SENS Request frame and Mode 4 to STA 3, and STA 2 and STA 3 each respond, STA 1 becomes a sensing initiator and receiver at the same time. On the other hand, STA 2 becomes a sensing responder and transmitter, and STA 3 becomes a responder and a sensing receiver like STA 1 at the same time.

Although the above example shows an example indicated by SENS RQSTA (STA 1), SENS RPSTA (STA 2, 3) may also indicate Mode in the SENS Response frame in response. According to the indications of RQSTA and RPSTA, roles can be negotiated as follows.

2-2) Negotiation according to role indications of RQSTA and RPSTA

Each RQSTA and RPSTA may indicate with 1 bit each whether to perform the role of a transmitter or receiver as follows, or may indicate the mode described above.

The table below shows negotiation example #1 according to the RQSTA and RPSTA role indications.

TABLE 3

| SENS RQSTA | | SENS RPSTA | | Determined roles | |
|---|---|---|---|---|---|
| Transmitter | Receiver | Transmitter | Receiver | RQSTA | RPSTA |
| 1 | 1 | 1 | 1 | | |
| 1 | 1 | 0 | 1 | | |
| 1 | 1 | 1 | 0 | | |
| 1 | 1 | 0 | 0 | | |
| 0 | 1 | 1 | 1 | | |
| 0 | 1 | 0 | 1 | Receiver | Receiver |
| 0 | 1 | 1 | 0 | Receiver | Transmitter |
| 0 | 1 | 0 | 0 | | |
| 1 | 0 | 1 | 1 | | |
| 1 | 0 | 0 | 1 | Transmitter | Receiver |
| 1 | 0 | 1 | 0 | Transmitter | Transmitter |
| 1 | 0 | 0 | 0 | | |
| 0 | 0 | 1 | 1 | | |
| 0 | 0 | 0 | 1 | | |
| 0 | 0 | 1 | 0 | | |
| 0 | 0 | 0 | 0 | | |

The table below shows negotiation example #2 according to the RQSTA and RPSTA role indications.

TABLE 4

| SENS RQSTA | SENS RPSTA | Determined roles | |
|---|---|---|---|
| Mode | Mode | RQSTA | RPSTA |
| 1 | 1 | Transmitter | Receiver |
| 1 | 2 | | |
| 1 | 3 | | |

TABLE 4-continued

| SENS RQSTA Mode | SENS RPSTA Mode | Determined roles RQSTA | RPSTA |
|---|---|---|---|
| 1 | 4 | | |
| 2 | 1 | | |
| 2 | 2 | Receiver | Transmitter |
| 2 | 3 | | |
| 2 | 4 | | |
| 3 | 1 | | |
| 3 | 2 | | |
| 3 | 3 | Transmitter | Transmitter |
| 3 | 4 | | |
| 4 | 1 | | |
| 4 | 2 | | |
| 4 | 3 | | |
| 4 | 4 | Receiver | Receiver |

The above example shows a case where negotiation is possible between RQSTA and RPSTA when roles do not overlap or when the same mode is indicated. In other words, the empty determined role in the example above may not be properly negotiated due to confusion. However, the role of this empty part may be determined according to a pre-determined rule between the two STAs. For example, if the RQSTA indicates both the transmitter and the receiver (11) and the RPSTA indicates only the receiver (01), the RQSTA becomes the transmitter. These rules may vary depending on how they are pre-determined.

The above role negotiation may be dynamically indicated by the initiator before performing each sensing after confirming STAs to participate in sensing and negotiating parameters in the negotiation phase. This is closely related to the method for determining which role each STA will play, as in the above 1-2) method. That is, it is necessary to indicate what role to play for STAs. Specific methods are as follows, but are not limited thereto.

A. STA ID List and Role Bitmap

Each STA ID is indicated, and then a bitmap corresponding to each STA indicates whether it is a transmitter (e.g., 1) or a receiver (e.g., 0). Here, the Bitmap can be parsed through the explicit Number of STAs indication, but the Number of STAs is not necessarily required because it can be inferred through the STA ID List.

The role bitmap may be configured in units of 8 bits for decoding, or may be configured as many as the number of STAs included in the STA ID List. However, basically, the bitmap is composed of 8-bit units as before, which is stable in terms of decoding. Meanwhile, in order to explicitly indicate the Bitmap size, the Bitmap size may be used instead of the Number of STA. For example, when the unit is 8 bits, a value of 2 is 16 bits, and a value of 1 is 8 bits.

B. Tuple <STA ID, Role>

That is, the role (transmitter or receiver) can be indicated through 1 bit behind the STA ID without configuring the bitmap separately above. As in A, the Number of STAs can be specified here, but it is not necessary because it can be inferred from the number of tuples.

C. STA ID List+Overall Role

In methods A and B, the role of each STA is flexibly indicated, but in Sensing, if the roles of the initiator and responder are always different, the role can be indicated with 1 bit. For example, if the initiator indicates a value of 1 to the transmitter, all responders that receive and respond become transmitters, and the initiator becomes a receiver.

Figure 31:
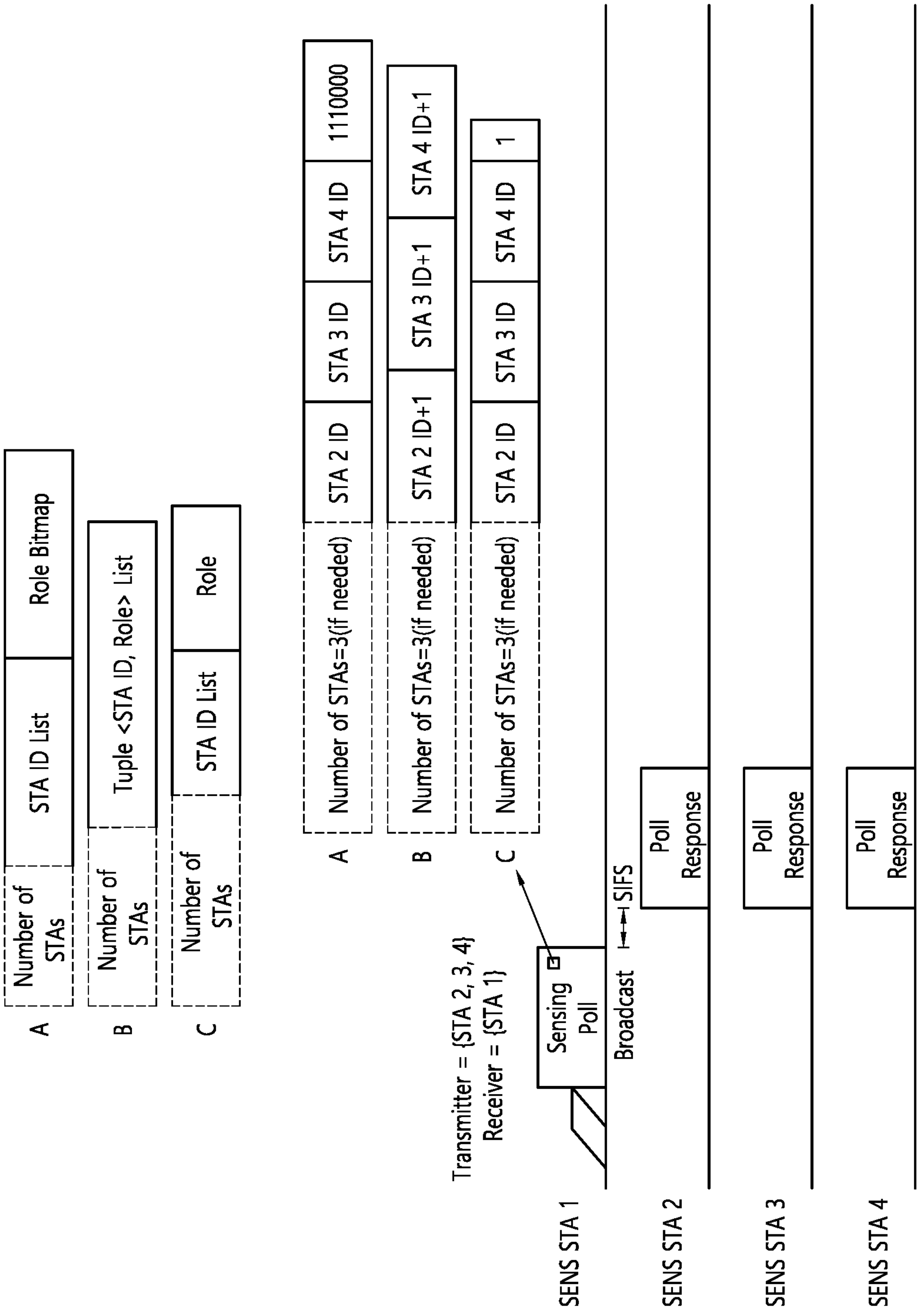
FIG. 31 shows a method of indicating a role according to methods A, B, and C.

FIG. 31 shows a method of indicating a role according to methods A, B, and C.

Referring to FIG. 31, STA 1, an initiator, determines the role of each STA 2, 3, and 4 through polling. At this time, if STAs 2, 3, and 4 simultaneously transmit for OFDMA/MIMO, etc., it is possible to check whether each STA is currently capable of sensing (e.g., whether the channel is IDLE) through whether or not transmission is performed. In this example, the Sensing Poll frame announces that STAs 2, 3, and 4 are Sensing Transmitters and STA 1 is a Receiver. In method A, since there are three STAs using each STA's ID and an 8-bit bitmap, the first 3 bits are indicated as 1 and the rest are reserved. Method B uses an STA ID and 1 bit (each value is 1) for each STA, and method C indicates the STA ID first and then indicates 1 bit that STAs 2, 3, and 4 are transmitters.

<Parameter Negotiation>

It is necessary to set the following parameters between SENS STAs during negotiation or other phases. The SENS Request frame and/or SENS Response frame may indicate one or more parameters described as follows. In the examples below, only the SENS Request frame is shown, and it can also be indicated in the SENS Response frame. In addition, in the example below, 2) method (e.g., broadcast) for SENS Request frame transmission of the negotiation procedure above is assumed and described, but 1) method (e.g., unicast) can also be used.

1) Timers for Negotiation phase: This embodiment can refer to the above-described negotiation procedure (e.g., 1-2) and 2-3) methods).
2) Timeout for Sensing phase: Timeout value related to sensing phase (including one or more sensing sessions) after negotiation. One or both of these timeout values can be separately indicated as follows.

Figure 32:
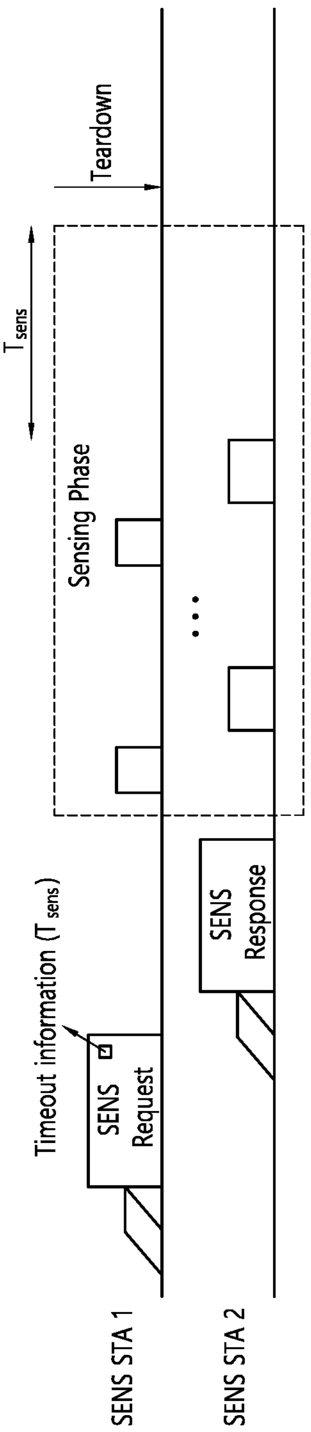
FIG. 32 illustrates embodiment 2-1) of tearing down negotiation when sensing-related frame exchange is not performed during T_sens.

FIG. 32 illustrates embodiment 2-1) of tearing down negotiation when sensing-related frame exchange is not performed during T_sens.

2-1) Timeout for tear down: After negotiation, if sensing-related frame exchange is not performed during this time (e.g., T_sens in FIG. 32) in the sensing phase, negotiation is teared down.

Figure 33:
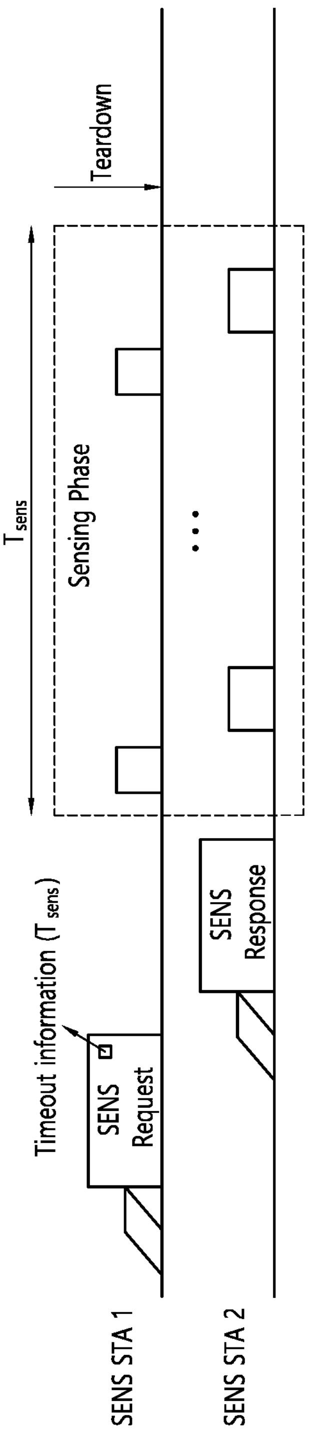
FIG. 33 shows Example 2-2) in which sensing is performed during T_sens and the sensing phase is terminated thereafter.

FIG. 33 shows Example 2-2) in which sensing is performed during T_sens and the sensing phase is terminated thereafter.

2-2) Timeout for Sensing: The time during which the sensing phase takes place. That is, during this time, sensing is performed using the negotiated role/parameter. As mentioned above, the process may consist of one or more sensing sessions. As shown in FIG. 28, the sensing phase ends after T_sens.

3) Number of sensing sessions: Parameter for how many times the sensing session defined above should be done
4) Mode for transmitter/receiver: This mode may refer to the role negotiation described above (including FIG. 24).
5) Information of SENS STA(s): As information about STAs participating in Sensing, this embodiment may refer to the above-described Negotiation Procedure (e.g., 2-2) method).
6) Group ID (GID): After the negotiation process, an ID can be assigned to the negotiated STAs as a group. That is, during this sensing phase, group ID is transmitted as shown in FIG. 29 to enable identification. In FIG. 29, STA1, 2, and 3 form one sensing group, and when STA 1 transmits a group ID, STA 2 and STA 3 participate in sensing together. Overhead can be reduced if only the GID is included instead of several STA IDs using this method, but it is difficult to use the GID to perform a sensing session with some negotiated STAs.

Figure 34:
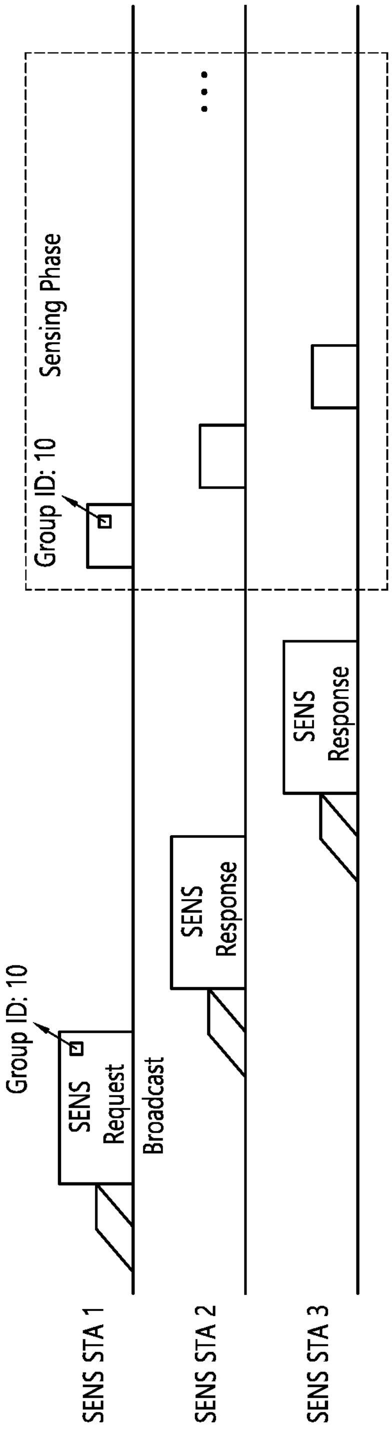
FIG. 34 shows Example 6) in which STA1, 2, and 3 form one sensing group and STA 2 and STA 3 participate in sensing together when STA 1 transmits a group ID.

FIG. 34 shows Example 6) in which STA1, 2, and 3 form one sensing group and STA 2 and STA 3 participate in sensing together when STA 1 transmits a group ID.

7) Signal Length: Transmission time of the sensing signal (sounding) transmitted by the transmitter in the sensing phase 8) Bandwidth to be measured or for feedback: It can indicate the bandwidth for the sensing signal during the sensing phase or the feedback as a result of measuring this signal. This may be indicated for all STAs or for each STA. Overhead is reduced if the instruction is directed to all STAs. However, if a specific STA can efficiently sense or feedback as in the method for indicating each STA, it cannot be instructed for a specific frequency.

Figure 35:
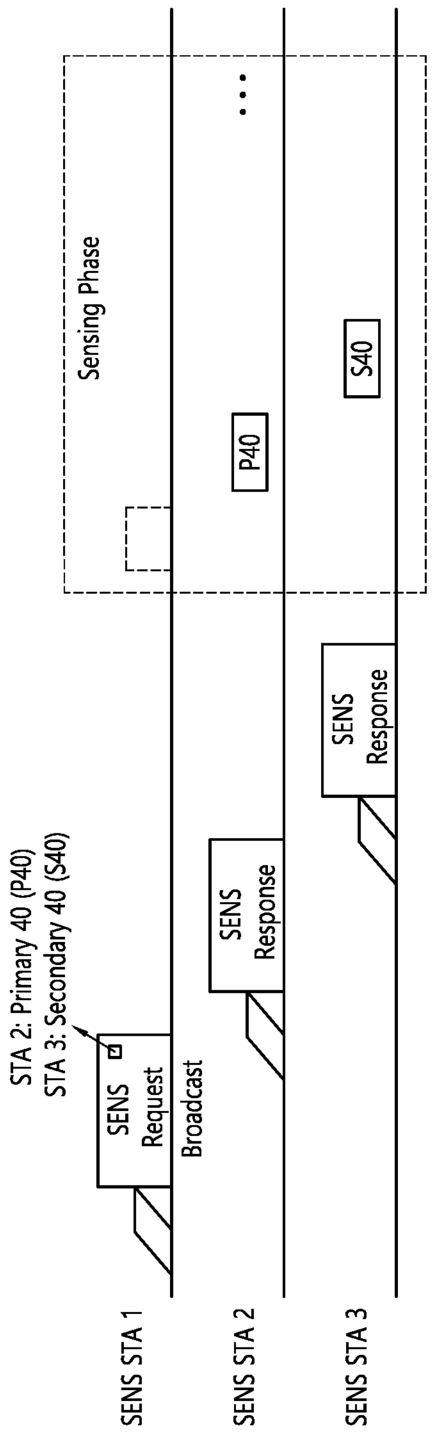
FIG. 35 shows an example in which sensing signals are transmitted and received by allocating primary 40 MHz to STA 2 and secondary 40 to STA 3 among 80 MHz.

8-1) Sensing frequency location: 7) may indicate the bandwidth of the same frequency, but in this regard, different locations to be measured may be indicated for each STA. For example, as shown in FIG. 35, STA 2 may be assigned primary 40 MHz and STA 3 secondary 40 among 80 MHz. This example shows the case where the sensing transmitters are STA 2 and STA 3. In addition, if the SENS STA supports the OFDMA technology of 11ax, a specific RU may be indicated.

FIG. 35 shows an example in which sensing signals are transmitted and received by allocating primary 40 MHz to STA 2 and secondary 40 to STA 3 among 80 MHz.

FIG. 35 shows an example in which sensing signals are transmitted and received by allocating primary 40 MHz to STA 2 and secondary 40 to STA 3 among 80 MHz.

9) Type of Information: The type of information to be measured through sensing signal reception during the sensing phase (for example, CSI per subcarrier)

10) Signal Type: The type of sensing signal during the sensing phase (e.g., NDP, NDPA+NDP, New signal type)

11) Order of reports/sensing: An order may be explicitly included for STAs in order to prevent collisions during sensing signal transmission or information feedback on signal measurement. Implicitly, for example, the order in which the STA information of 4) is indicated may be regarded as this order. If this information is indicated and assuming FIG. 30, the order of sensing transmitters STA 2 and STA 3 is STA 2→STA 3.

12) Session ID: ID for a session that uses the role and parameters determined through this negotiation phase. As mentioned at the beginning, one SENS STA can simultaneously execute several sensing applications, and several SENS STAs can also simultaneously execute sensing applications. That is, since several sessions may overlap if a sensing procedure for each application is performed at the same time, it is necessary for SENS STAs to perform sensing by distinguishing these sessions. Therefore, session ID may be indicated.

Figure 36:
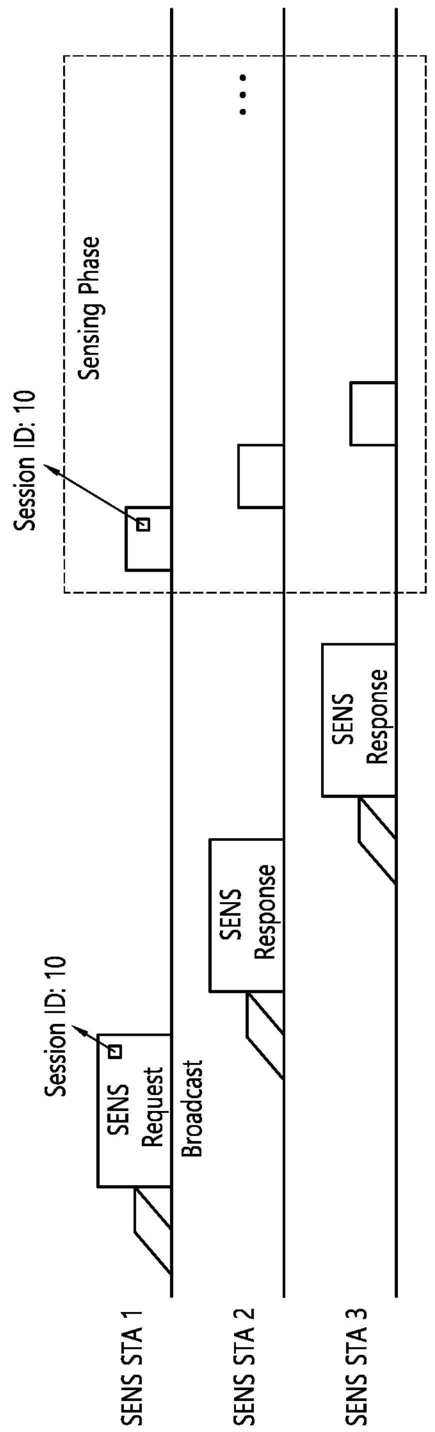
FIG. 36 shows an example of a sensing procedure in which Session ID is used.

FIG. 36 shows an example of a sensing procedure in which Session ID is used.

Referring to FIG. 36, when STA 1 transmits a session ID, STA 2 and STA 3 recognize this session ID. Therefore, when this session ID is received in the sensing phase, sensing can be performed according to the negotiated role and parameters.

<Sensing Phase regarding Negotiation>

If this embodiment goes through the above negotiation process, the sensing phase will be performed based on this negotiated role and parameters. Basically, a sensing phase can consist of one or more sensing sessions as mentioned above, and a frame that can start a sensing session can exist. In this specification, this frame is referred to as a SENS Initiation frame. All or some of the parameters described in parameter negotiation can be indicated in the SENS Initiation frame.

Figure 37:
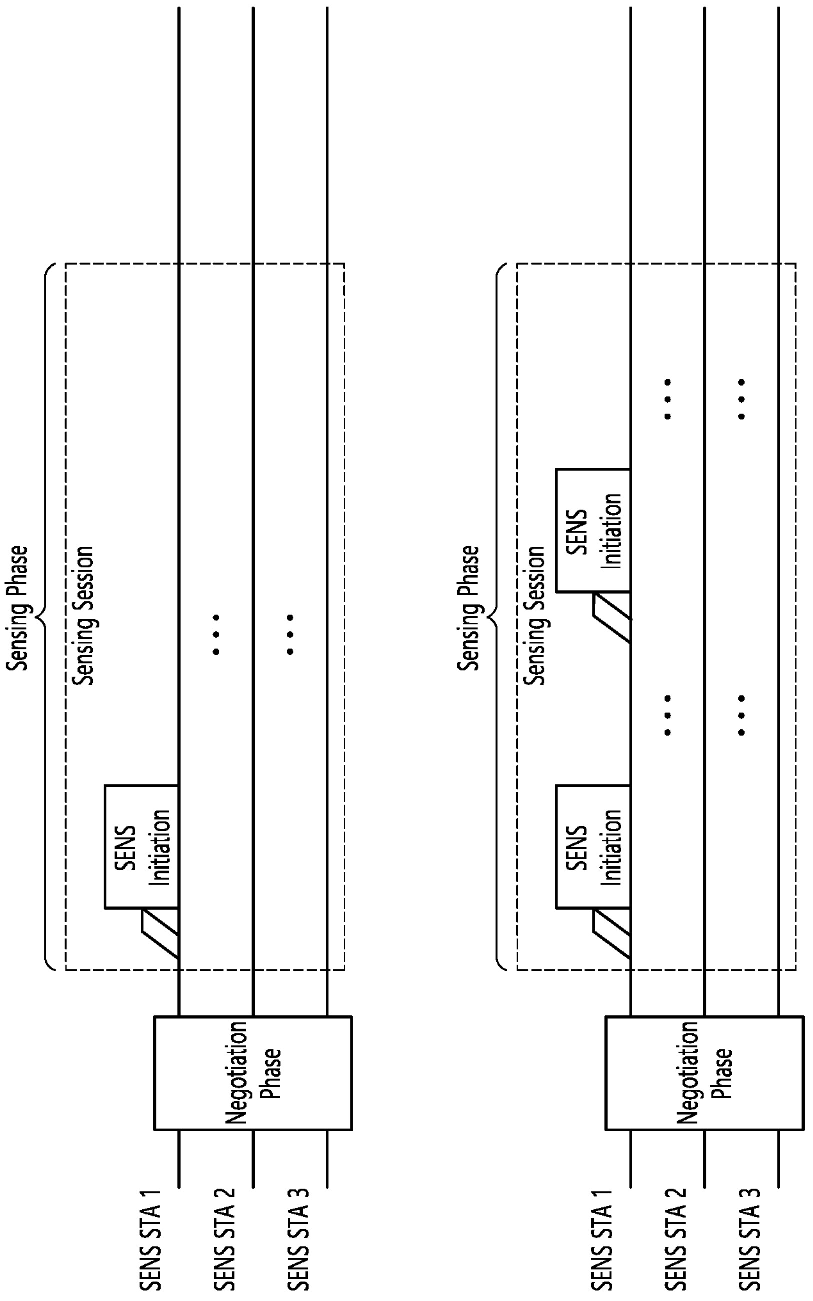
FIG. 37 shows an example in which a SENS initiation frame is transmitted multiple times.

FIG. 37 shows an example in which a SENS initiation frame is transmitted multiple times.

For example, information of STAs, Group ID, Session ID, etc. may be basically included for one sensing session. As shown in FIG. 37, the SENS initiation frame may be transmitted once or several times. For example, when STAs to participate in the sensing phase are changed, frames may be transmitted several times.

Figure 38:
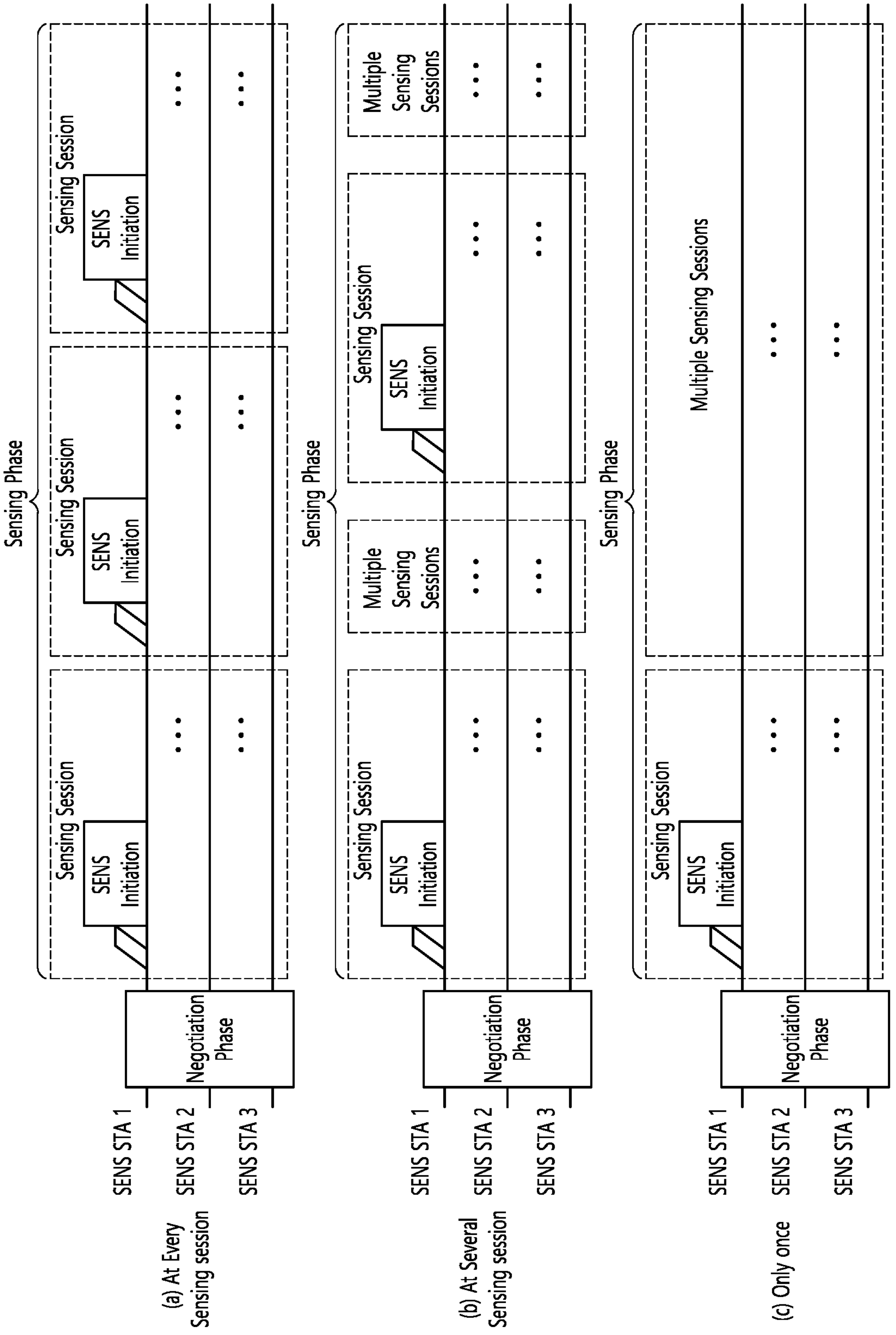
FIG. 38 illustrates an example in which a SENS initiation frame is transmitted for each sensing session.

FIG. 38 illustrates an example in which a SENS initiation frame is transmitted for each sensing session.

Also, as shown in FIG. 38, the SENS initiation frame may be transmitted only once during A. when all sensing sessions start, B. when some sensing sessions start, or C. during a sensing phase.

In method A, each SENS STA can recognize the session through explicit signaling for the sensing session. Methods B and C may require a separate indication to the sensing signal from the perspective of the sensing transmitter for some sensing sessions, and a method for recognizing the sensing signal from the perspective of the sensing receiver, but the overhead for the initiation frame can be reduced.

Although channel access is performed between each session in FIG. 38, each session may be followed through an SIFS interval by acquiring a TXOP that can include several sessions.

All or some of the parameters described in parameter negotiation can be indicated in the SENS Initiation frame. For example, information or group ID of STAs may be basically included for one sensing session.

Unless specifically shown in the examples below, in the sensing phase, there may be various methods (for example, SENS RQSTA transmits the role of a transmitter or receiver, sensing signal or feedback is transmitted sequentially or based on OFDMA) according to negotiation in the sensing phase. Therefore, detailed frame exchange is not described. Also, it is assumed that STA 1 is a SENS Initiator.

<Reduced Negotiation Phase>

Figure 39:
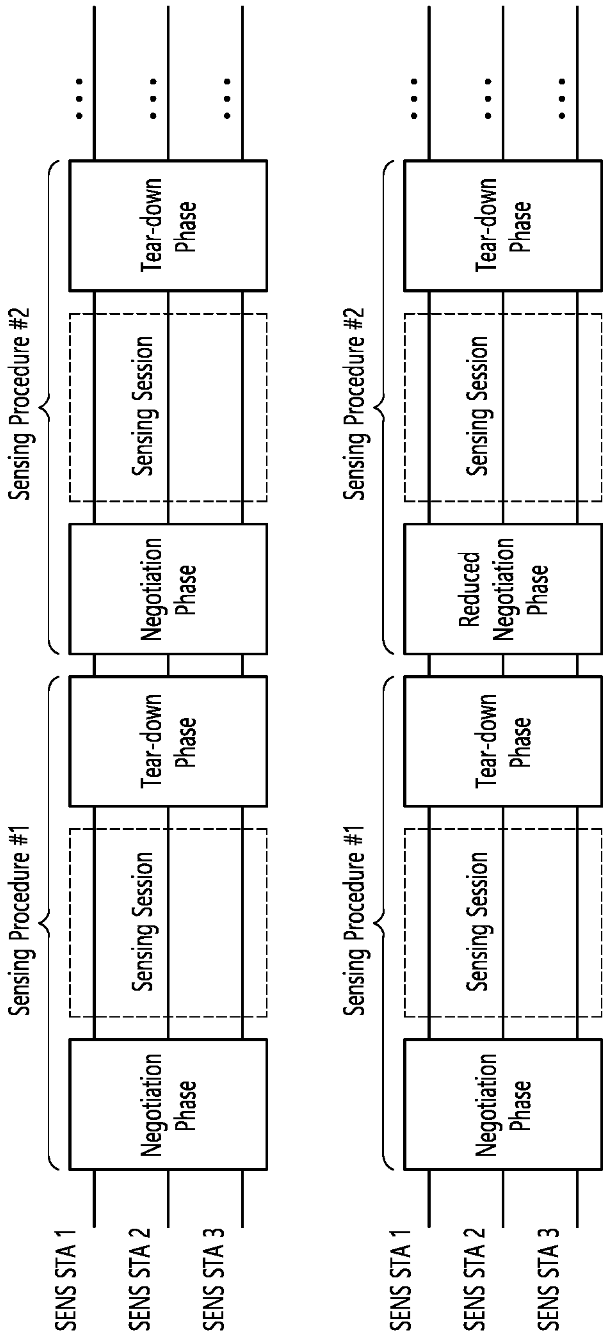
FIG. 39 shows an example of a negotiation phase and a reduced negotiation phase.

FIG. 39 shows an example of a negotiation phase and a reduced negotiation phase.

As mentioned above, since a negotiation phase for WLAN sensing exists in each sensing session, after one sensing session ends, the negotiation phase is performed again in the next sensing session as shown in the upper part of FIG. 39. Here, if the roles and parameters in the previous session hardly change, re-executing the negotiation phase as it is can be a waste of resources. Therefore, in this embodiment, only roles and parameters to be changed may be negotiated. In this embodiment, this phase is referred to as a reduced negotiation phase, and as shown in the lower part of FIG. 39, the reduced negotiation phase may be applied in the negotiation phase for the next sensing session.

Figure 40:
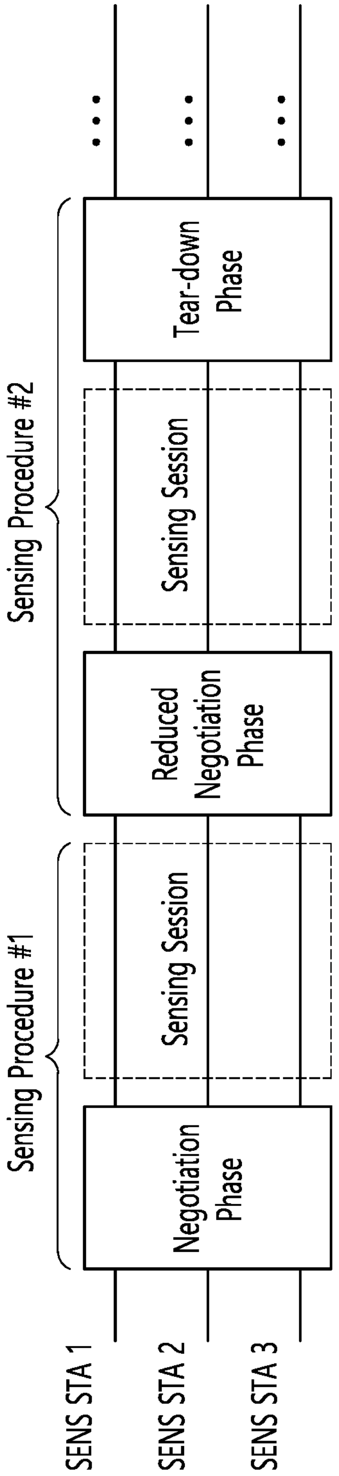
FIG. 40 shows another example of a negotiation phase and a reduced negotiation phase.

FIG. 40 shows another example of a negotiation phase and a reduced negotiation phase.

In the reduced negotiation phase, a reduced SENS Request/Response frame with reduced overhead including only roles and parameters to be changed can be used. That is, roles and parameters that are not indicated inherit those used in the previous session. In addition, if it is inherited, as shown in FIG. 40, it can go directly to the reduced negotiation phase that negotiates only the changed role/and parameters without the tear-down phase after the previous session.

Including fields for immutable roles and parameters has no effect on reducing overhead. Therefore, a reduced SENS Request/Response frame with reduced overhead including only the role and parameters to be changed can be used.

Control field can be applied for the role and parameters to be changed. That is, except for fields that must be entered in the SENS Request/Response frame, a field indicating whether or not a changed parameter exists is included. In the example below, this parameter is referred to as a dynamic parameter.

Based on the basic process above, it can be classified into the following cases depending on whether there is a negotiation procedure described above, the negotiated role/parameter, and whether it is static or dynamic.

1) Static negotiated roles and parameters

In this case, since the roles and parameters negotiated during the sensing phase are basically unchanged, the changed roles and parameters cannot be separately indicated in the SENS initiation frame. However, all or some of the parameters described in parameter negotiation above can be repeatedly indicated in the SENS initiation frame.

2) Dynamic negotiated roles and parameters

Figure 41:
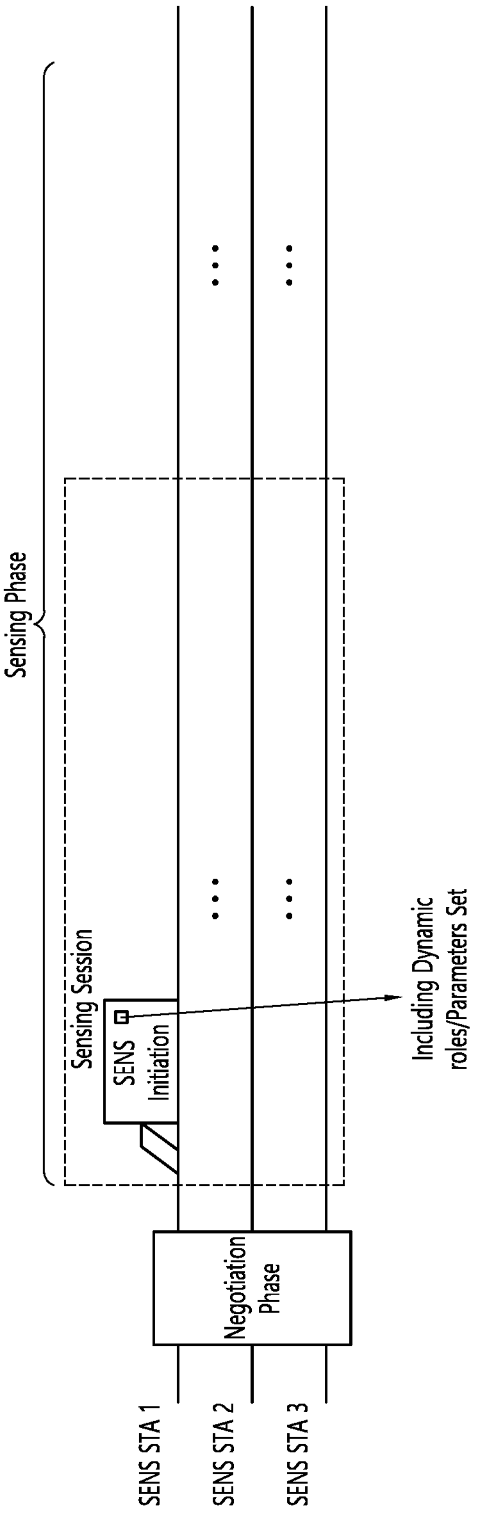
FIG. 41 shows an example of dynamic change for negotiated roles and parameters.

In this case, the roles and parameters, which were basically decided during the negotiation phase during the sensing phase, can be changed. Therefore, as shown in FIG. 41, the changed parameters can be indicated in the SENS Initiation frame. These parameters can correspond to the parameters mentioned in parameter negotiation above.

FIG. 41 shows an example of dynamic change for negotiated roles and parameters.

On the other hand, since there may be overhead in including the corresponding field in the SENS Initiation frame in preparation for these dynamic parameters, the control field can be applied. That is, a field indicating whether or not a dynamic parameter is present is included except for fields that are necessarily included in the SENS initiation frame.

Figure 42:
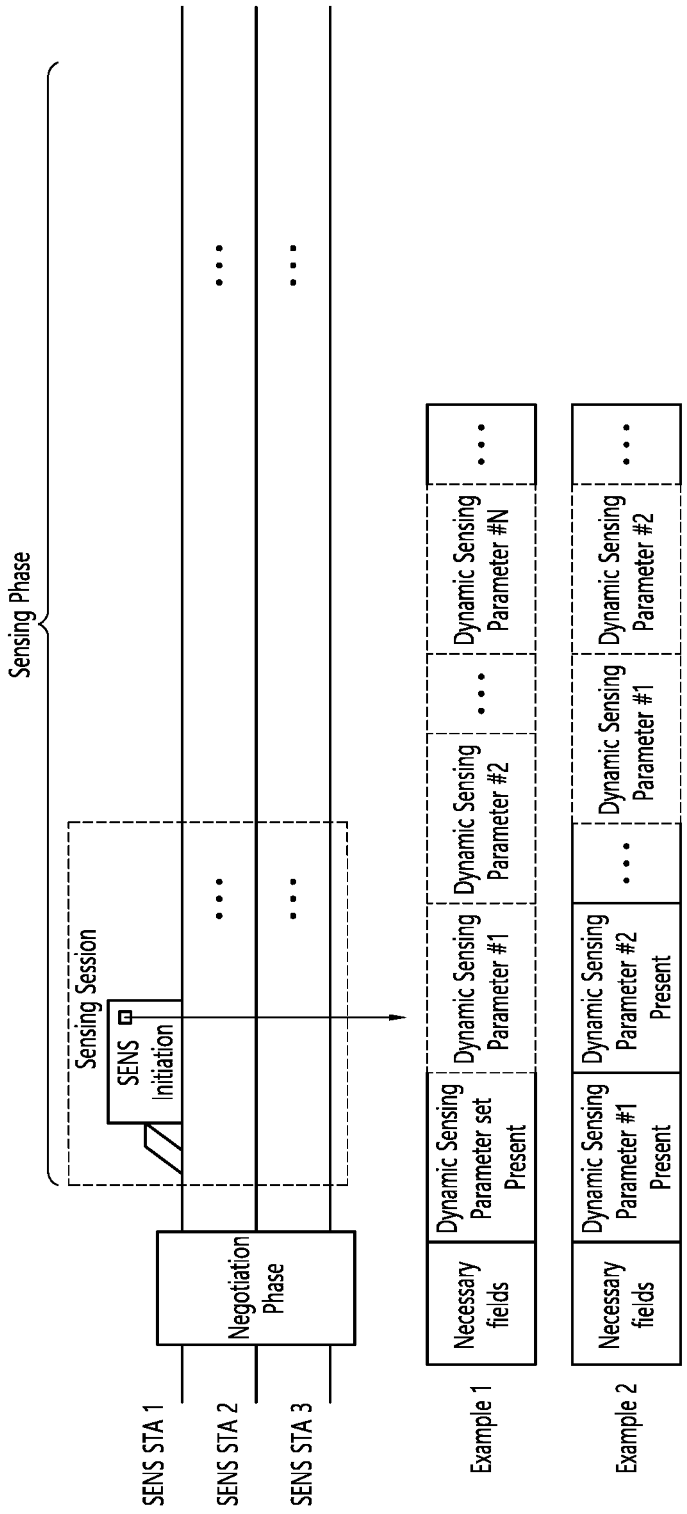
FIG. 42 is an example of a control field for Dynamic Parameter.

FIG. 42 is an example of a control field for Dynamic Parameter.

Referring to FIG. 42, as in Example 1, whether or not a dynamic parameter exists is first indicated (e.g., 1 bit is used), and if there is, a parameter set is indicated later. As in Example 2, the presence or absence of each dynamic parameter may be indicated. Depending on the situation, it is judged that Example 2 can reduce the overhead more when the number of dynamic parameters is large.

On the other hand, the above indicated the case of changing the negotiated parameter in one SENS initiation frame that initiates the sensing session, but the parameter can be dynamically changed as follows.

Figure 43:
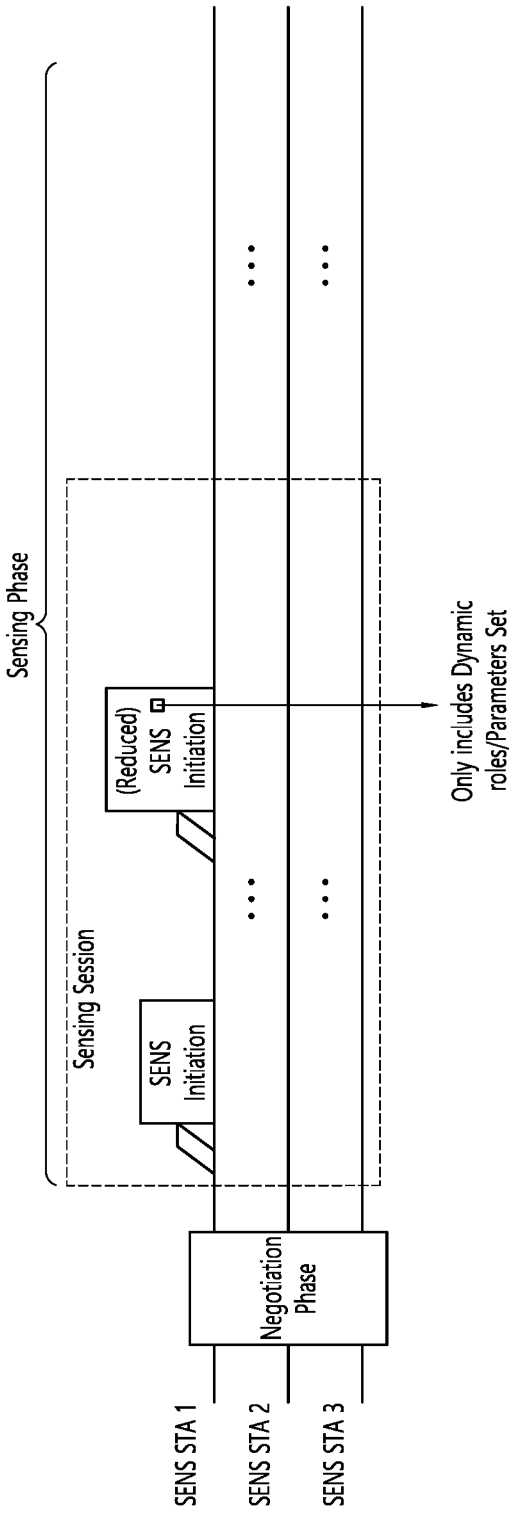
FIG. 43 shows an example of dynamic change for negotiated roles and parameters using a reduced SENS initiation frame.

1) In case of transmitting SENS initiation frame or reduced SENS initiation frame within One Sensing Session That is, several SENS initiation frames are transmitted within one sensing session, or a frame (e.g., reduced SENS initiation frame) including only dynamic role/parameters is transmitted as shown in FIG. 43.

FIG. 43 shows an example of dynamic change for negotiated roles and parameters using a reduced SENS initiation frame.

2) In case of re-negotiation between sensing sessions

That is, the negotiation phase is performed again between sensing sessions. In this process, the SENS Request/Response frame described above can be reused, but including fields for unchanging roles and parameters can result in higher overhead. Therefore, as shown in FIG. 43, a reduced SENS Request/Response frame with reduced overhead including only the role and parameters to be changed can be used. In addition to this frame exchange, a SENS initiation frame and a reduced SENS initiation frame may be used as in 1).

Figure 44:
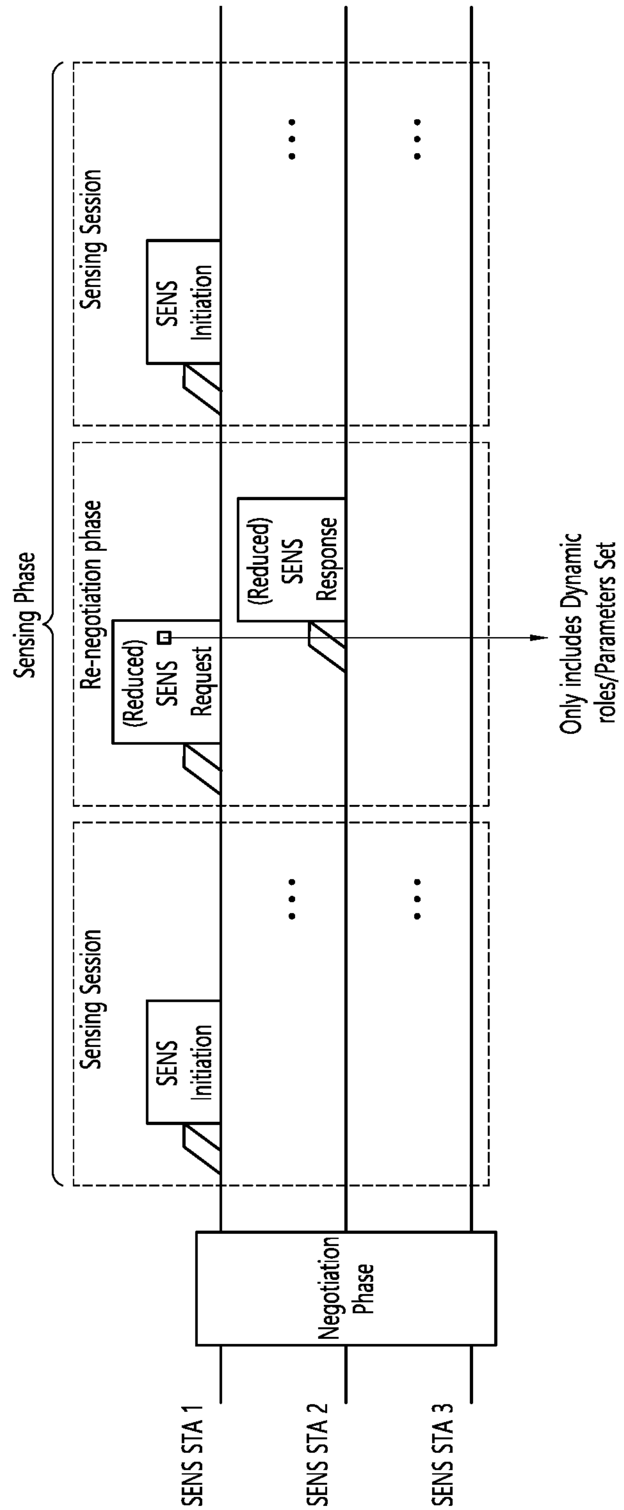
FIG. 44 shows an example of dynamic change for negotiated roles and parameters using a reduced SENS Request/Response frame during the Re-negotiation phase.

FIG. 44 shows an example of dynamic change for negotiated roles and parameters using a reduced SENS Request/Response frame during the Re-negotiation phase.

Example #1: Change Role

Figure 45:
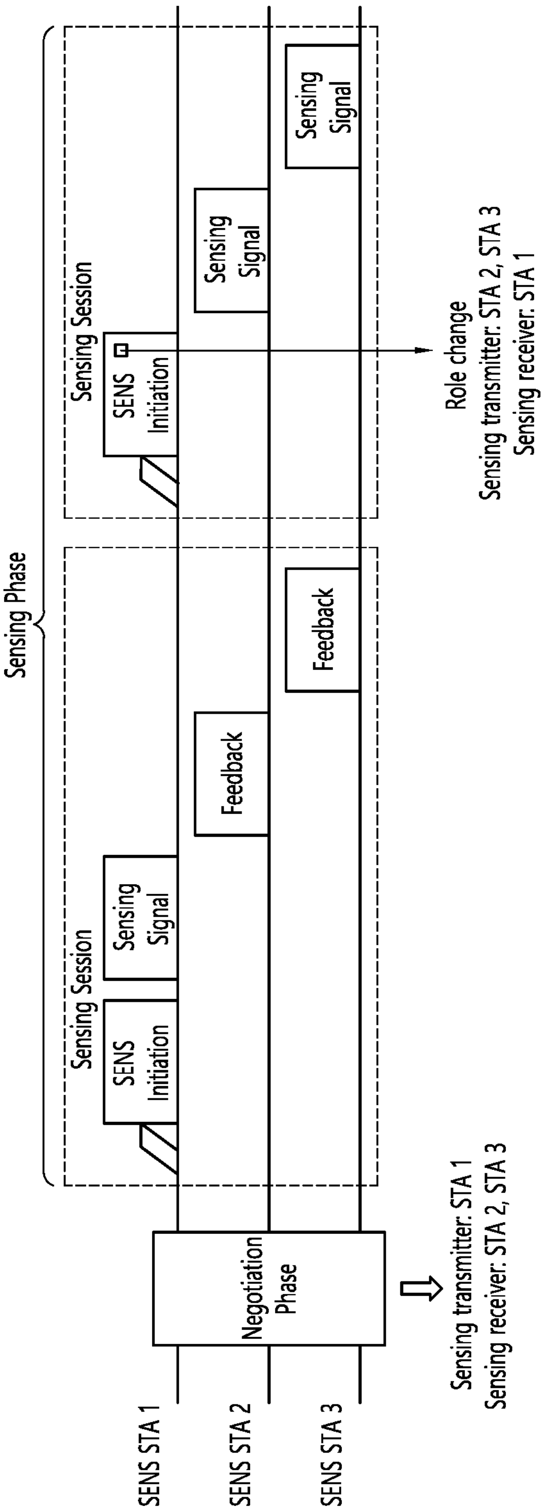
FIG. 45 shows an example of changing a role in Example 2).

FIG. 45 shows an example of changing a role in Example 2).

Referring to FIG. 45, during the negotiation phase, the sensing transmitter is set to STA 1, and the sensing receiver is set to STA 2 and STA 3. In the second sensing session, STA 1 changes the sensing transmitter to STA 2 and STA 3 and the sensing receiver to STA 1 through the SENS initiation frame to measure the channel in a different direction, and STA 2 and STA 3 transmit sensing signals.

Example #2: Changing Bandwidth to be Measured

Figure 46:
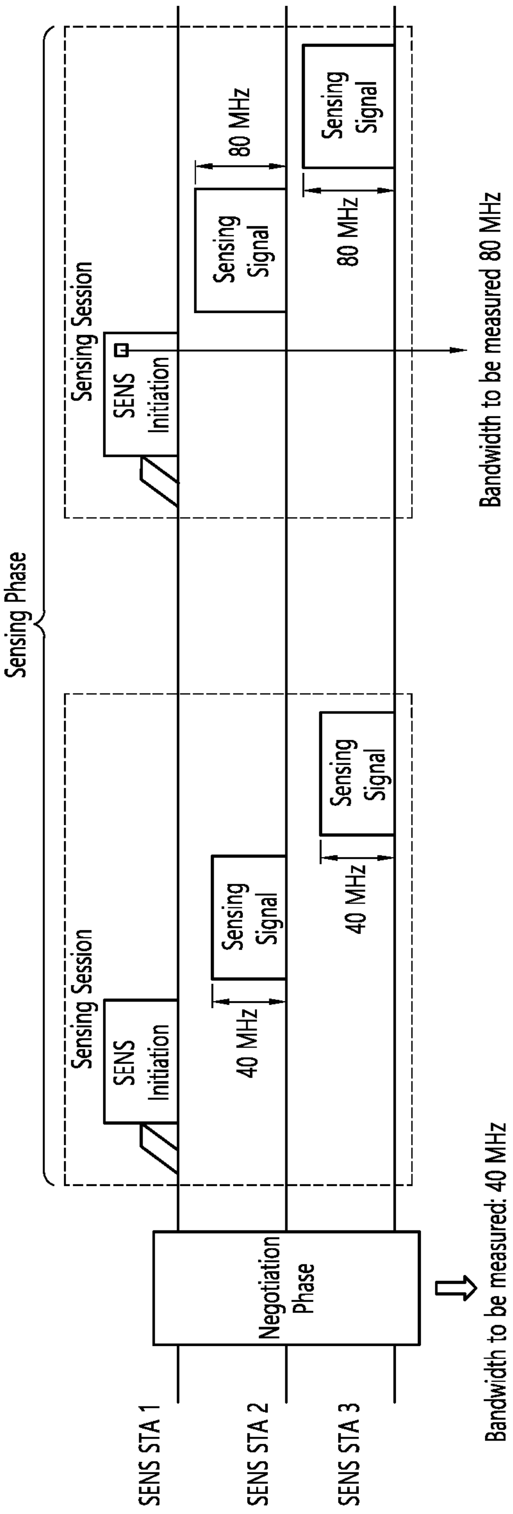
FIG. 46 shows an example of changing the bandwidth to be measured in embodiment 2).

FIG. 46 shows an example of changing the bandwidth to be measured in embodiment 2).

Referring to FIG. 46, an example in which the bandwidth to be measured during the negotiation phase is 40 MHz. In the second sensing session, STA 1 changes the bandwidth to be measured to 80 MHz through the SENS initiation frame for better resolution. Therefore, STA 2 and STA 3, which are sensing transmitters, transmit sensing signals using 80 MHz.

Example #3: Change STA Information

Figure 47:
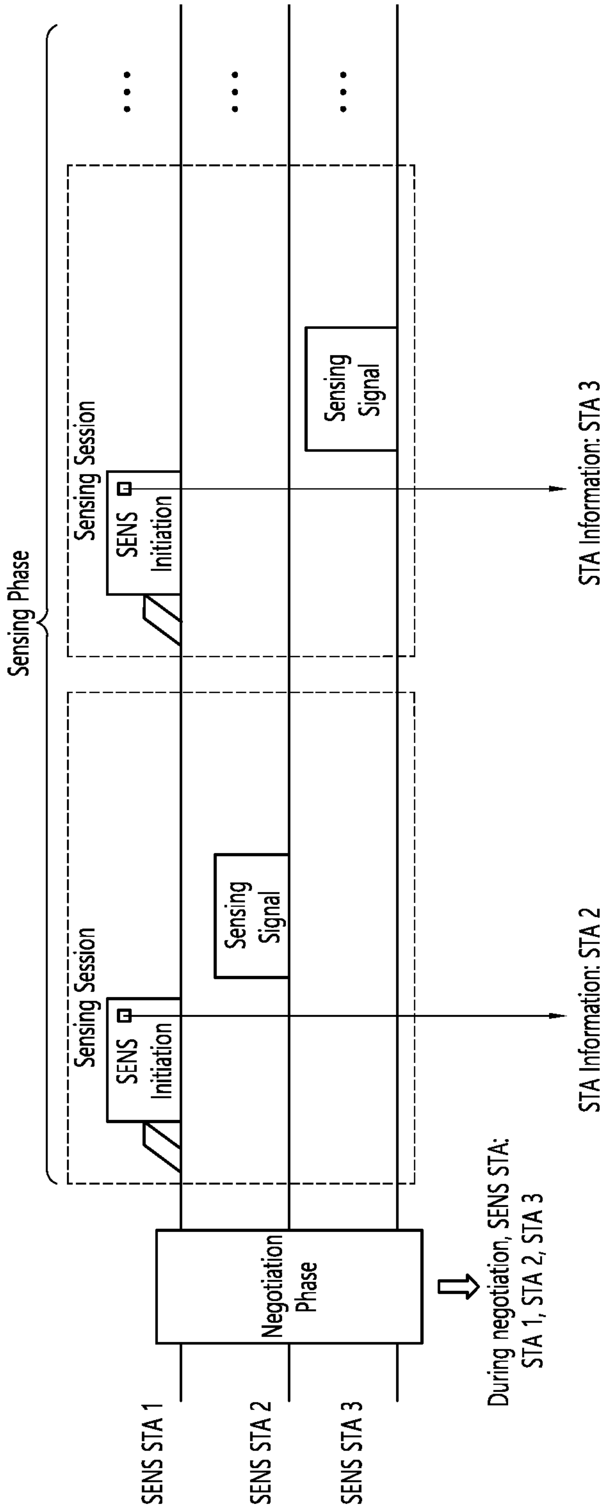
FIG. 47 is an example of changing STA information in Embodiment 2).

FIG. 47 is an example of changing STA information in Embodiment 2).

Referring to FIG. 47, during the negotiation phase, negotiation STAs are STA 1, STA 2, and STA 3. In the first session, only STA 2 is instructed and only STA 2 transmits a sensing signal, and in the second session, only STA 3 is instructed and a sensing signal is transmitted. By continuously changing the STA information in this way, it is possible to perform a sensing session with other STAs for each session.

This dynamic method described above can be applied in some different ways. That is, roles/parameters changed in one sensing session are continuously applied in subsequent sensing sessions, or applied only to the corresponding sensing session, and originally negotiated parameters are applied in subsequent sensing sessions.

3) Without negotiation phase

Since there is basically no negotiation phase in this case, the roles and parameters described above must be indicated through the SENS Initiation frame during the Sensing phase. Like cases 1) and 2), this case can be divided into static/dynamic cases according to the transmission of the SENS Initiation frame.

For example, if a SENS Initiation frame is transmitted in the first sensing session and is not transmitted thereafter, it can be considered as static, and if it is transmitted including changed parameters thereafter, it can be considered as a dynamic case.

Hereinafter, the above-described embodiment will be described with reference to FIGS. 1 to 47.

Figure 48:
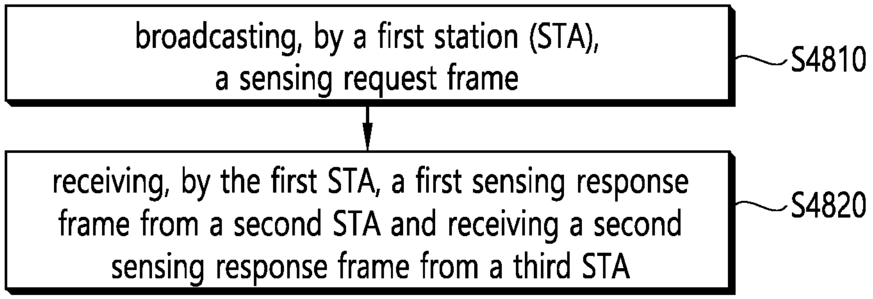
FIG. 48 is a flowchart illustrating a procedure in which a sensing initiator performs sensing according to the present embodiment.

FIG. 48 is a flowchart illustrating a procedure in which a sensing initiator performs sensing according to the present embodiment.

The example of FIG. 48 may be performed in a network environment in which a next-generation wireless LAN system (IEEE 802.11bf) is supported. The next-generation wireless LAN system is a wireless LAN system improved from 802.11ad and 802.11 ay systems, and may satisfy backward compatibility with 802.11ad and 802.11 ay systems.

The example of FIG. 48 is performed in a first STA, and the first STA may correspond to a sensing initiator. The second and third STAs of FIG. 48 may correspond to sensing responders.

This embodiment proposes a method for determining STAs to participate in sensing in a WLAN system, negotiating parameters to be used for sensing, and performing a sensing procedure based on the negotiated parameters. In particular, this embodiment proposes a method for role negotiation in the negotiation step, parameter negotiation, and parameter change in the sensing step.

In step S4810, a first station (STA) broadcasts a sensing request frame.

In step S4820, The first STA receives a first sensing response frame from a second STA and receives a second sensing response frame from a third STA.

The sensing request frame includes STA identifier information and resource unit (RU) allocation information. The STA identifier information includes identifiers of the second and third STAs. The RU allocation information includes information on a first RU allocated to the second STA and information on a second RU allocated to the third STA.

The first sensing response frame is received through the first RU, and the second sensing response frame is received through the second RU. That is, the response to the sensing request frame may be (simultaneously) received by the second and third STAs based on orthogonal frequency division multiple access (OFDMA). The sensing request frame may be a (newly defined) trigger frame. When the STA identifier information does not include an identifier of a fourth STA, the first STA does not receive a third sensing response frame from the fourth STA.

That is, in this embodiment, the sensing request frame indicates an identifier (ID) of an STA to receive a sensing response frame and RU allocation information, the STA corresponding to the identifier of the STA receives the sensing request frame, and transmits the sensing response frame after SIFS through the allocated RU.

The sensing request frame may further include timer information for receiving the sensing response frame. Before the timer according to the timer information expires, the first and second sensing response frames may be transmitted. After the timer according to the timer information expires, the third sensing response frame may not be transmitted. That is, since the STA receiving the timer information can know until when the sensing request frame is transmitted, it can transmit the sensing response frame until the timer expires.

The sensing request frame may further include parameter information.

The parameter information includes timer information for a negotiation step, role information of a STA, timeout information for a sensing step, information on a number of sensing sessions included in the sensing step, and information on the first to third STAs, information on a length of a sensing signal, information on a frequency band to which the sensing signal is allocated, information on a type of information to be measured based on the sensing signal, information on a type of the sensing signal, and information on a transmission order of the sensing signal.

A procedure for wireless sensing may largely include a setup phase, a negotiation phase, a sensing phase, and a tear down phase. Each step may be performed in the order described, and may be repeated several times in one cycle period. The sensing step may include at least one sensing session.

In the negotiation step, the sensing request frame and the first and second sensing response frames may be exchanged. In the sensing step, the sensing signal may be transmitted, and channel measurement may be performed based on the sensing signal. The sensing step may be torn down when there is no frame exchange during a time indicated by the timeout information for the sensing step. In the tear down step, negotiated parameter information is reset, and all sensing sessions in the sensing step may be terminated. In order to initiate the sensing session again, the negotiation phase has to go through again.

After the timer according to the timer information for the negotiation step expires, an additional sensing request frame may not be transmitted by the first STA.

The role information of the STA may be set to a first or second mode.

The first mode may include information that the first STA is a transmitter for transmitting the sensing signal, and that the second and third STAs are receivers for receiving the sensing signal and performing channel measurement based on the sensing signal. The second mode may include information that the first STA is the receiver and the second and third STAs are the transmitter. That is, the roles of the first to third STAs may be designated in the sensing step (or sensing session) based on the first and second modes.

when the role information of the STA is set to the second mode, the first STA may receive a first sensing signal from the second STA, and perform channel measurement based on the first sensing signal. The first STA may receive a second sensing signal from the third STA, and perform channel measurement based on the second sensing signal.

In addition, the role information of the STA may be utilized together with the STA identifier information. For example, when the role information of the STA is set to the first mode and the STA identifier information includes only the identifier of the second STA, the first and second STAs may be transmitters, and the third STA may be a receiver. As another example, when the role information of the STA is set to the second mode and the STA identifier information includes only the identifier of the third STA, the first and third STAs may be the receiver, and the second STA may be the transmitter.

The information on the frequency band to which the sensing signal is allocated may include information on primary 40 MHz allocated to the second STA and information on secondary 40 MHz allocated to the third STA. In this case, the first sensing signal may be received through the primary 40 MHz, and the second sensing signal may be received through the secondary 40 MHz.

When the sensing step includes first and second sensing sessions, the first STA may transmit a first sensing initiation frame to the second and third STAs during the first sensing session. The first STA may transmit a second sensing initiation frame to the second and third STAs during the second sensing session.

When the parameter information is changed in the second sensing session, the second sensing initiation frame may include a control field for a changed parameter. The control field for the changed parameter may include first and second fields. The first field may include information on whether the changed parameter exists. The second field may include a changed parameter value indicated by the first field.

A sensing procedure performed during the first sensing session may be performed by the first to third STAs based on a parameter value before being changed. A sensing procedure performed during the second sensing session may be performed by the first to third STAs based on the changed parameter value.

For example, the changed parameter may be role information of the STA. In the negotiation step, assuming that the role information of the STA is set to the second mode, the first STA may be set as the receiver, and the second and third STAs may be set as the transmitters. In this case, during the first sensing session, the second and third STAs may each transmit a sensing signal to the first STA, and the first STA may feed back a value measured based on the sensing signal.

However, when the role information of the STA is changed to the first mode in the second sensing session, the first STA may be set as the transmitter, and the second and third STAs may be set as the receivers. Accordingly, during the second sensing session, the first STA may transmit the sensing signal to the second and third STAs, and the second and third STAs may feed back a value measured based on the sensing signal. Role switching occurs between the first to third STAs.

As another example, the changed parameter may be information on a frequency band to which the sensing signal is allocated. When the information on the frequency band to which the sensing signal is allocated in the second sensing session is changed to information on primary 80 MHz allocated to the second STA and information on secondary 80 MHz allocated to the third STA, the first sensing signal transmitted by the second STA may be transmitted through the primary 80 MHz, and the second sensing signal transmitted by the third STA may be transmitted through the secondary 80 MHz.

Figure 49:
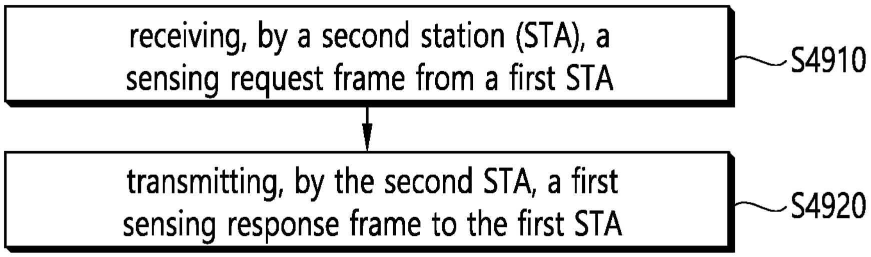
FIG. 49 is a flowchart illustrating a procedure in which a sensing responder performs sensing according to the present embodiment.

FIG. 49 is a flowchart illustrating a procedure in which a sensing responder performs sensing according to the present embodiment.

The example of FIG. 49 may be performed in a network environment in which a next-generation wireless LAN system (IEEE 802.11bf) is supported. The next-generation wireless LAN system is a wireless LAN system improved from 802.11ad and 802.11 ay systems, and may satisfy backward compatibility with 802.11ad and 802.11 ay systems.

The example of FIG. 49 is performed in a second STA, and the second STA may correspond to a sensing responder. The first STA of FIG. 49 may correspond to a sensing initiator. The third STA of FIG. 49 may also correspond to the sensing responder.

This embodiment proposes a method for determining STAs to participate in sensing in a WLAN system, negotiating parameters to be used for sensing, and performing a sensing procedure based on the negotiated parameters. In particular, this embodiment proposes a method for role negotiation in the negotiation step, parameter negotiation, and parameter change in the sensing step.

In step S4910, a second station (STA) receives a sensing request frame from a first STA.

In step S4920, the second STA transmits a first sensing response frame to the first STA. In response to the sensing request frame, a second sensing response frame is transmitted by the third STA.

The sensing request frame includes STA identifier information and resource unit (RU) allocation information. The STA identifier information includes identifiers of the second and third STAs. The RU allocation information includes information on a first RU allocated to the second STA and information on a second RU allocated to the third STA.

The first sensing response frame is received through the first RU, and the second sensing response frame is received through the second RU. That is, the response to the sensing request frame may be (simultaneously) received by the second and third STAs based on orthogonal frequency division multiple access (OFDMA). The sensing request frame may be a (newly defined) trigger frame. When the STA identifier information does not include an identifier of a fourth STA, the first STA does not receive a third sensing response frame from the fourth STA.

That is, in this embodiment, the sensing request frame indicates an identifier (ID) of an STA to receive a sensing response frame and RU allocation information, the STA corresponding to the identifier of the STA receives the sensing request frame, and transmits the sensing response frame after SIFS through the allocated RU.

The sensing request frame may further include timer information for receiving the sensing response frame. Before the timer according to the timer information expires, the first and second sensing response frames may be transmitted. After the timer according to the timer information expires, the third sensing response frame may not be transmitted. That is, since the STA receiving the timer information can know until when the sensing request frame is transmitted, it can transmit the sensing response frame until the timer expires.

The sensing request frame may further include parameter information.

The parameter information includes timer information for a negotiation step, role information of a STA, timeout information for a sensing step, information on a number of sensing sessions included in the sensing step, and information on the first to third STAs, information on a length of a sensing signal, information on a frequency band to which the sensing signal is allocated, information on a type of information to be measured based on the sensing signal, information on a type of the sensing signal, and information on a transmission order of the sensing signal.

A procedure for wireless sensing may largely include a setup phase, a negotiation phase, a sensing phase, and a tear down phase. Each step may be performed in the order described, and may be repeated several times in one cycle period. The sensing step may include at least one sensing session.

In the negotiation step, the sensing request frame and the first and second sensing response frames may be exchanged. In the sensing step, the sensing signal may be transmitted, and channel measurement may be performed based on the sensing signal. The sensing step may be torn down when there is no frame exchange during a time indicated by the timeout information for the sensing step. In the tear down step, negotiated parameter information is reset, and all sensing sessions in the sensing step may be terminated. In order to initiate the sensing session again, the negotiation phase has to go through again.

After the timer according to the timer information for the negotiation step expires, an additional sensing request frame may not be transmitted by the first STA.

The role information of the STA may be set to a first or second mode.

The first mode may include information that the first STA is a transmitter for transmitting the sensing signal, and that the second and third STAs are receivers for receiving the sensing signal and performing channel measurement based on the sensing signal. The second mode may include information that the first STA is the receiver and the second and third STAs are the transmitter. That is, the roles of the first to third STAs may be designated in the sensing step (or sensing session) based on the first and second modes.

when the role information of the STA is set to the second mode, the first STA may receive a first sensing signal from the second STA, and perform channel measurement based on the first sensing signal. The first STA may receive a second sensing signal from the third STA, and perform channel measurement based on the second sensing signal.

In addition, the role information of the STA may be utilized together with the STA identifier information. For example, when the role information of the STA is set to the first mode and the STA identifier information includes only the identifier of the second STA, the first and second STAs may be transmitters, and the third STA may be a receiver. As another example, when the role information of the STA is set to the second mode and the STA identifier information includes only the identifier of the third STA, the first and third STAs may be the receiver, and the second STA may be the transmitter.

The information on the frequency band to which the sensing signal is allocated may include information on primary 40 MHz allocated to the second STA and information on secondary 40 MHz allocated to the third STA. In this case, the first sensing signal may be received through the primary 40 MHz, and the second sensing signal may be received through the secondary 40 MHz.

When the sensing step includes first and second sensing sessions, the first STA may transmit a first sensing initiation frame to the second and third STAs during the first sensing session. The first STA may transmit a second sensing initiation frame to the second and third STAs during the second sensing session.

When the parameter information is changed in the second sensing session, the second sensing initiation frame may include a control field for a changed parameter. The control field for the changed parameter may include first and second fields. The first field may include information on whether the changed parameter exists. The second field may include a changed parameter value indicated by the first field.

A sensing procedure performed during the first sensing session may be performed by the first to third STAs based on a parameter value before being changed. A sensing procedure performed during the second sensing session may be performed by the first to third STAs based on the changed parameter value.

For example, the changed parameter may be role information of the STA. In the negotiation step, assuming that the role information of the STA is set to the second mode, the first STA may be set as the receiver, and the second and third STAs may be set as the transmitters. In this case, during the first sensing session, the second and third STAs may each transmit a sensing signal to the first STA, and the first STA may feed back a value measured based on the sensing signal.

However, when the role information of the STA is changed to the first mode in the second sensing session, the first STA may be set as the transmitter, and the second and third STAs may be set as the receivers. Accordingly, during the second sensing session, the first STA may transmit the sensing signal to the second and third STAs, and the second and third STAs may feed back a value measured based on the sensing signal. Role switching occurs between the first to third STAs.

As another example, the changed parameter may be information on a frequency band to which the sensing signal is allocated. When the information on the frequency band to which the sensing signal is allocated in the second sensing session is changed to information on primary 80 MHz allocated to the second STA and information on secondary 80 MHz allocated to the third STA, the first sensing signal transmitted by the second STA may be transmitted through the primary 80 MHz, and the second sensing signal transmitted by the third STA may be transmitted through the secondary 80 MHz.

The technical features of the present disclosure may be applied to various devices and methods. For example, the technical features of the present disclosure may be performed/supported through the device(s) of FIG. 1 and/or FIG. 8. For example, the technical features of the present disclosure may be applied to only part of FIG. 1 and/or FIG. 8. For example, the device according to the present disclosure broadcasts a sensing request frame; and receives a first sensing response frame from a second station (STA) and receives a second sensing response frame from a third STA.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including broadcasting a sensing request frame; and receiving a first sensing response frame from a second station (STA) and receiving a second sensing response frame from a third STA. The instructions stored in the CRM of the present specification may be executed by at least one processor. The CRM in the present specification may be a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function.

The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

broadcasting, by a first station (STA), a sensing request frame; and receiving, by the first STA, a first sensing response frame from a second STA and receiving a second sensing response frame from a third STA, wherein the sensing request frame includes parameter information, wherein the parameter information includes role information of a STA, timeout information for a sensing measurement session and information on a frequency band to which the sensing signal is allocated, wherein the timeout information includes a value which is a time after which the sensing measurement session is terminated if there are no frame exchange sequences, and wherein the sensing measurement session is terminated after an expiration of the timeout information.

2. The method of claim 1, wherein the sensing request frame further includes timer information for receiving the sensing response frame, wherein before the timer according to the timer information expires, the first and second sensing response frames are transmitted, wherein after the timer according to the timer information expires, the third sensing response frame is not transmitted.

3. The method of claim 1, wherein the sensing request frame further includes STA identifier information and Resource Unit (RU) allocation information, wherein the STA identifier information includes identifiers of the second and third STAs, wherein the RU allocation information includes information on a first RU allocated to the second STA and information on a second RU allocated to the third STA, wherein the first sensing response frame is received through the first RU, wherein the second sensing response frame is received through the second RU, wherein the parameter information further includes timer information for a negotiation step, information on a number of sensing sessions included in the sensing measurement session, and information on the first to third STAs, information on a length of a sensing signal, information on a type of information to be measured based on the sensing signal, information on a type of the sensing signal, and information on a transmission order of the sensing signal, wherein in the negotiation step, the sensing request frame and the first and second sensing response frames are exchanged, wherein in the sensing measurement session, the sensing signal is transmitted, and channel measurement is performed based on the sensing signal.

4. The method of claim 3, wherein after the timer according to the timer information for the negotiation step expires, an additional sensing request frame is not transmitted by the first STA.

5. The method of claim 3, wherein the role information of the STA is set to a first or second mode, wherein the first mode includes information that the first STA is a transmitter for transmitting the sensing signal, and that the second and third STAs are receivers for receiving the sensing signal and performing channel measurement based on the sensing signal, wherein the second mode includes information that the first STA is the receiver and the second and third STAs are the transmitter.

6. The method of claim 5, further comprising:

wherein when the role information of the STA is set to the second mode, receiving, by the first STA, a first sensing signal from the second STA;

performing, by the first STA, channel measurement based on the first sensing signal;

receiving, by the first STA, a second sensing signal from the third STA; and performing, by the first STA, channel measurement based on the second sensing signal.

7. The method of claim 6, wherein the information on the frequency band to which the sensing signal is allocated includes information on primary 40 MHz allocated to the second STA and information on secondary 40 MHz allocated to the third STA, wherein the first sensing signal is received through the primary 40 MHZ, wherein the second sensing signal is received through the secondary 40 MHz.

8. The method of claim 3, further comprising:

wherein when the sensing measurement session includes first and second sensing sessions, transmitting, by the first STA, a first sensing initiation frame to the second and third STAs during the first sensing session; and transmitting, by the first STA, a second sensing initiation frame to the second and third STAs during the second sensing session, wherein when the parameter information is changed in the second sensing session, the second sensing initiation frame includes a control field for a changed parameter, wherein the control field for the changed parameter includes first and second fields, wherein the first field includes information on whether the changed parameter exists, wherein the second field includes a changed parameter value indicated by the first field.

9. The method of claim 8, wherein a sensing procedure performed during the first sensing session is performed by the first to third STAs based on a parameter value before being changed;

wherein a sensing procedure performed during the second sensing session is performed by the first to third STAs based on the changed parameter value.

10. A first station (STA) in a wireless local area network (WLAN) system, the first STA comprising:

a memory;

a transceiver; and a processor being operatively connected to the memory and the transceiver, wherein the processor is configured to:

broadcast a sensing request frame; and receive a first sensing response frame from a second STA and receiving a second sensing response frame from a third STA, wherein the sensing request frame includes parameter information, wherein the parameter information includes role information of a STA, timeout information for a sensing measurement session and information on a frequency band to which the sensing signal is allocated, wherein the timeout information includes a value which is a time after which the sensing measurement session is terminated if there are no frame exchange sequences, and wherein the sensing measurement session is terminated after an expiration of the timeout information.

11. A method in a wireless local area network (WLAN) system, the method comprising:

receiving, by a second station (STA), a sensing request frame from a first STA; and transmitting, by the second STA, a first sensing response frame to the first STA, wherein in response to the sensing request frame, a second sensing response frame is transmitted by a third STA, wherein the sensing request frame includes parameter information, wherein the parameter information includes role information of a STA, timeout information for a sensing measurement session and information on a frequency band to which the sensing signal is allocated, wherein the timeout information includes a value which is a time after which the sensing measurement session is terminated if there are no frame exchange sequences, and wherein the sensing measurement session is terminated after an expiration of the timeout information.

12. The method of claim 11, wherein the sensing request frame further includes STA identifier information and Resource Unit (RU) allocation information, wherein the STA identifier information includes identifiers of the second and third STAs, wherein the RU allocation information includes information on a first RU allocated to the second STA and information on a second RU allocated to the third STA, wherein the first sensing response frame is received through the first RU, wherein the second sensing response frame is received through the second RU, wherein the parameter information further includes timer information for a negotiation step, information on a number of sensing sessions included in the sensing measurement session, and information on the first to third STAs, information on a length of a sensing signal, information on a type of information to be measured based on the sensing signal, information on a type of the sensing signal, and information on a transmission order of the sensing signal, wherein in the negotiation step, the sensing request frame and the first and second sensing response frames are exchanged, wherein in the sensing measurement session, the sensing signal is transmitted, and channel measurement is performed based on the sensing signal.

13. The method of claim 12, wherein the role information of the STA is set to a first or second mode, wherein the first mode includes information that the first STA is a transmitter for transmitting the sensing signal, and that the second and third STAs are receivers for receiving the sensing signal and performing channel measurement based on the sensing signal, wherein the second mode includes information that the first STA is the receiver and the second and third STAs are the transmitter.

14. The method of claim 13, further comprising:

wherein when the role information of the STA is set to the second mode, transmitting, by the second STA, a first sensing signal to the first STA; and receiving, by the second STA, a value measured based on the first sensing signal from the first STA.

* * * * *